US012541157B2

(12) United States Patent
Shirasuna et al.

(10) Patent No.: US 12,541,157 B2
(45) Date of Patent: Feb. 3, 2026

(54) ELECTROPHOTOGRAPHIC PHOTOSENSITIVE MEMBER, PROCESS CARTRIDGE, ELECTROPHOTOGRAPHIC APPARATUS, AND METHOD OF PRODUCING ELECTROPHOTOGRAPHIC PHOTOSENSITIVE MEMBER

(71) Applicant: CANON KABUSHIKI KAISHA, Tokyo (JP)

(72) Inventors: Toshiyasu Shirasuna, Shizuoka (JP); Jun Ohira, Ibaraki (JP); Eileen Takeuchi, Tokyo (JP); Ikuyo Kuroiwa, Tokyo (JP); Tsuyoshi Shimada, Chiba (JP); Takanori Ueno, Kanagawa (JP); Kenichi Ikari, Chiba (JP); Haruhiko Mitsuda, Chiba (JP); Ryoichi Tokimitsu, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 385 days.

(21) Appl. No.: 18/161,115

(22) Filed: Jan. 30, 2023

(65) Prior Publication Data

US 2023/0259047 A1 Aug. 17, 2023

(30) Foreign Application Priority Data

Feb. 14, 2022 (JP) ................................ 2022-020583

(51) Int. Cl.
*G03G 5/147* (2006.01)
*G03G 21/18* (2006.01)

(52) U.S. Cl.
CPC ..... *G03G 5/14791* (2013.01); *G03G 5/14726* (2013.01); *G03G 21/1814* (2013.01)

(58) Field of Classification Search
CPC ............... G03G 5/147; G03G 5/14713; G03G 5/14726; G03G 5/14791
See application file for complete search history.

(56) References Cited

U.S. PATENT DOCUMENTS

| | | | |
|---|---|---|---|
| 7,229,730 | B2 | 6/2007 | Ohira |
| 7,229,731 | B2 | 6/2007 | Aoki |
| 9,594,318 | B2 | 3/2017 | Nakata |
| 9,766,561 | B2 | 9/2017 | Takahashi |
| 9,811,012 | B2 | 11/2017 | Murakami |
| 9,817,324 | B2 | 11/2017 | Kitamura |
| 9,971,258 | B2 | 5/2018 | Kitamura |
| 9,983,490 | B2 | 5/2018 | Shimada |

(Continued)

FOREIGN PATENT DOCUMENTS

| | | | |
|---|---|---|---|
| JP | 6-332219 | A | 12/1994 |
| JP | 2009-104145 | A | 5/2009 |

(Continued)

OTHER PUBLICATIONS

Translation of JP 2014-038139.*

(Continued)

*Primary Examiner* — Peter L Vajda
(74) *Attorney, Agent, or Firm* — VENABLE LLP

(57) ABSTRACT

Provided is an electrophotographic photosensitive member including a surface layer, wherein the surface layer contains a fluorine atom-containing resin particle, a binder material, and a polymer having specific structural units.

21 Claims, 4 Drawing Sheets

(56) References Cited

U.S. PATENT DOCUMENTS

| | | | |
|---|---|---|---|
| 10,241,429 B2 | 3/2019 | Shimada | |
| 10,310,395 B2 | 6/2019 | Nakata | |
| 10,338,486 B2 | 7/2019 | Abe | |
| 10,353,340 B2 | 7/2019 | Kuroiwa | |
| 10,359,729 B2 | 7/2019 | Ichihashi | |
| 10,365,569 B2 | 7/2019 | Tokimitsu | |
| 10,488,770 B2 | 11/2019 | Kuroiwa | |
| 10,642,175 B2 | 5/2020 | Ohira | |
| 10,705,440 B2 | 7/2020 | Ueno | |
| 10,838,314 B2 | 11/2020 | Ikezue | |
| 10,921,723 B2 | 2/2021 | Takizawa | |
| 10,969,703 B2 | 4/2021 | Takeuchi | |
| 10,976,677 B2 | 4/2021 | Tokimitsu | |
| 11,112,706 B2 | 9/2021 | Takeuchi | |
| 11,169,453 B2 | 11/2021 | Takeuchi | |
| 11,204,560 B2 | 12/2021 | Tokimitsu | |
| 11,269,282 B2 | 3/2022 | Ikari | |
| 11,556,082 B2 | 1/2023 | Tsuruga | |
| 2008/0199795 A1 | 8/2008 | Ogaki | |
| 2019/0033734 A1 | 1/2019 | Yoshizawa et al. | |
| 2020/0233322 A1* | 7/2020 | Choda | G03G 5/047 |
| 2020/0257212 A1* | 8/2020 | Iwasaki | C08F 290/062 |
| 2021/0080843 A1 | 3/2021 | Sasaki | |
| 2021/0088918 A1 | 3/2021 | Kusano | |
| 2021/0302847 A1 | 9/2021 | Ichihashi | |

FOREIGN PATENT DOCUMENTS

| | | | | |
|---|---|---|---|---|
| JP | 2012-189715 A | | 10/2012 | |
| JP | 2013200418 A | | 10/2013 | |
| JP | 2014-038139 | * | 2/2014 | G03G 5/147 |
| JP | 2015-152629 A | | 8/2015 | |
| JP | 2018-132722 | * | 8/2018 | G03G 5/147 |
| JP | 2021-47236 A | | 3/2021 | |
| WO | 2008/053904 A1 | | 5/2008 | |
| WO | 2017/170613 A1 | | 10/2017 | |
| WO | 2019/070003 A1 | | 4/2019 | |

OTHER PUBLICATIONS

Translation of JP 2018-132722.*
U.S. Appl. No. 18/051,584, Haruki Mori, filed Nov. 1, 2022.
U.S. Appl. No. 18/156,611, Ryoichi Tokimitsu, filed Jan. 19, 2023.
U.S. Appl. No. 18/161,113, Haruhiko Mitsuda, filed Jan. 30, 2023.
U.S. Appl. No. 18/161,328, Jun Ohira, filed Jan. 30, 2023.

* cited by examiner

ELECTROPHOTOGRAPHIC PHOTOSENSITIVE MEMBER, PROCESS CARTRIDGE, ELECTROPHOTOGRAPHIC APPARATUS, AND METHOD OF PRODUCING ELECTROPHOTOGRAPHIC PHOTOSENSITIVE MEMBER

BACKGROUND OF THE INVENTION

Field of the Invention

The present disclosure relates to an electrophotographic photosensitive member, a process cartridge including the electrophotographic photosensitive member, an electrophotographic apparatus including the electrophotographic photosensitive member, and a method of producing an electrophotographic photosensitive member.

Description of the Related Art

As an electrophotographic photosensitive member to be mounted onto an electrophotographic apparatus, there is widely used an electrophotographic photosensitive member containing an organic photoconductive substance (charge generating substance). In recent years, an improvement in mechanical durability (abrasion resistance) of the electrophotographic photosensitive member has been required for the purposes of lengthening the lifetime of the electrophotographic photosensitive member and improving image quality at the time of its repeated use.

An example of a technology of improving the abrasion resistance of the electrophotographic photosensitive member is a method including incorporating a fluorine atom-containing resin particle into the surface layer of the electrophotographic photosensitive member to reduce a friction force between the surface layer and a member such as a cleaning blade to be brought into contact with the surface of the electrophotographic photosensitive member. In Japanese Patent Application Laid-Open No. H06-332219, there is a disclosure of a technology including forming a surface layer through use of a dispersion liquid of a fluorine atom-containing resin particle such as a polytetrafluoroethylene resin particle as a coating liquid for a surface layer.

In addition, at the time of the preparation of the dispersion liquid of the fluorine atom-containing resin particle, there has been known a method including using a (meth)acrylic polymer containing a fluorine atom as a dispersant for the purpose of improving the dispersibility of the fluorine atom-containing resin particle. In each of Japanese Patent Application Laid-Open No. 2012-189715, Japanese Patent Application Laid-Open No. 2009-104145, and Japanese Patent Application Laid-Open No. 2021-47236, there is a disclosure of a technology of improving the dispersibility of the fluorine atom-containing resin particle through use of a fluorine atom-containing (meth)acrylic polymer having a specific structure as a dispersant.

However, in each of the technologies disclosed in Japanese Patent Application Laid-Open No. 2012-189715, Japanese Patent Application Laid-Open No. 2009-104145, and Japanese Patent Application Laid-Open No. 2021-47236, an electrophotographic photosensitive member excellent in uniformity of the dispersion of the fluorine atom-containing resin particle in its surface layer is obtained, but at the time of repeated use of the electrophotographic photosensitive member, a potential fluctuation cannot be sufficiently suppressed in some cases. That is, the technologies disclosed in Japanese Patent Application Laid-Open No. 2012-189715, Japanese Patent Application Laid-Open No. 2009-104145, and Japanese Patent Application Laid-Open No. 2021-47236 have each been susceptible to improvement in terms of suppression of a potential fluctuation at the time of the repeated use of the electrophotographic photosensitive member.

SUMMARY OF THE INVENTION

One aspect of the present disclosure is directed to provide an electrophotographic photosensitive member, which is excellent in uniformity of the dispersion of a fluorine atom-containing resin particle in its surface layer, and is suppressed from causing a potential fluctuation at the time of its repeated use.

In addition, another aspect of the present disclosure is directed to provide a process cartridge including the electrophotographic photosensitive member and an electrophotographic apparatus including the process cartridge.

In addition, another aspect of the present disclosure is directed to provide a method of producing the electrophotographic photosensitive member.

According to one aspect of the present disclosure, there is provided an electrophotographic photosensitive member including a surface layer, wherein the surface layer contains a fluorine atom-containing resin particle, a binder material, and a polymer A having a structural unit represented by the following formula (1):

(1)

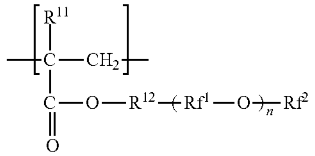

in the formula (1), $R^{11}$ represents a hydrogen atom or a methyl group, $R^{12}$ represents a single bond, a methylene group, or an ethylene group, "n" represents an integer of 3 or more, "n" $Rf^1$s each independently represent a perfluoroalkylene group having 1 to 5 carbon atoms, or a perfluoroalkylidene group having 1 to 5 carbon atoms, and $Rf^2$ represents a perfluoroalkyl group having 1 to 5 carbon atoms.

In addition, according to another aspect of the present disclosure, there is provided a process cartridge including: the electrophotographic photosensitive member; and at least one unit selected from the group consisting of: a charging unit; a developing unit; and a cleaning unit, the process cartridge integrally supporting the electrophotographic photosensitive member and the at least one unit, and being detachably attachable to a main body of an electrophotographic apparatus.

In addition, according to another aspect of the present disclosure, there is provided an electrophotographic apparatus including: the electrophotographic photosensitive member; a charging unit; an exposing unit; a developing unit; and a transfer unit.

In addition, according to another aspect of the present disclosure, there is provided a method of producing an electrophotographic photosensitive member including a surface layer, the method including: preparing a coating liquid for a surface layer containing a polymer A having a structural unit represented by the following formula (1), a fluorine atom-containing resin particle, and at least one selected from a binder material and a raw material for the binder material; and forming the surface layer by forming a coating film of the coating liquid for a surface layer, and subjecting the coating film to at least one treatment selected from drying and curing:

(1)

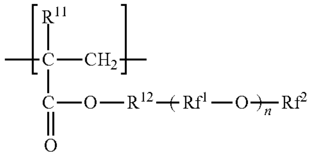

in the formula (1), $R^{11}$ represents a hydrogen atom or a methyl group, $R^{12}$ represents a single bond, a methylene group, or an ethylene group, "n" represents an integer of 3 or more, "n" $Rf^1$s each independently represent a perfluoroalkylene group having 1 to 5 carbon atoms, or a perfluoroalkylidene group having 1 to 5 carbon atoms, and $Rf^2$ represents a perfluoroalkyl group having 1 to 5 carbon atoms.

Further features of the present invention will become apparent from the following description of exemplary embodiments with reference to the attached drawings.

DESCRIPTION OF THE EMBODIMENTS

Figure 1:
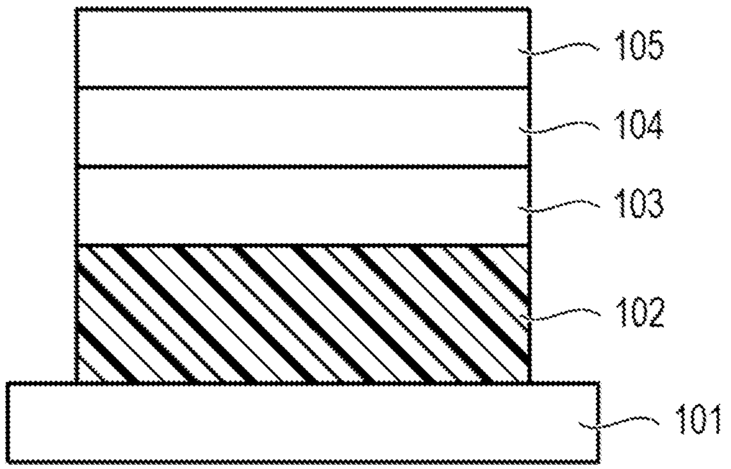
FIG. 1 is a schematic view for illustrating an example of the configuration of an electrophotographic photosensitive member of the present disclosure.

An electrophotographic photosensitive member according to the present disclosure is an electrophotographic photosensitive member including a surface layer, wherein the surface layer contains a fluorine atom-containing resin particle, a binder material, and a polymer A having a structural unit represented by the following formula (1):

(1)

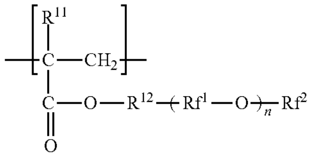

in the formula (1), $R^{11}$ represents a hydrogen atom or a methyl group, $R^{12}$ represents a single bond, a methylene group, or an ethylene group, "n" represents an integer of 3 or more, "n" $Rf^1$s each independently represent a perfluoroalkylene group having 1 to 5 carbon atoms, or a perfluoroalkylidene group having 1 to 5 carbon atoms, and $Rf^2$ represents a perfluoroalkyl group having 1 to 5 carbon atoms.

The inventors have made an investigation, and as a result, have found that when the above-mentioned electrophotographic photosensitive member according to the present disclosure is used, the uniformity of the dispersion of the fluorine atom-containing resin particle in the surface layer can be made excellent, and a fluctuation in potential of the photosensitive member at the time of its repeated use can be suppressed.

Here, the inventors have conceived that the polymer A having the structural unit represented by the formula (1) serves as a dispersant for the fluorine atom-containing resin particle in the step of preparing a coating liquid for a surface layer for forming the surface layer of the electrophotographic photosensitive member.

The inventors have assumed the reason why the electrophotographic photosensitive member according to the present disclosure is excellent in uniformity of the dispersion of the fluorine atom-containing resin particle in the surface layer, and is excellent in suppression of a potential fluctuation at the time of its repeated use to be as described below.

An electrophotographic photosensitive member including a surface layer containing a fluorine atom-containing resin particle and a dispersant having a $-(CF_2)_n$-chain tends to show a large potential fluctuation at the time of its repeated use. A possible reason for the foregoing is as described below.

In the surface layer, the fluorine atom-containing resin particle adheres to the $-(CF_2)_n-$ chain of the dispersant. Charge may be liable to accumulate in the $-(CF_2)_n$-chain to which the fluorine atom-containing resin particle adheres. Accordingly, when the electrophotographic photosensitive member including the surface layer containing the fluorine atom-containing resin particle and the dispersant having the $-(CF_2)_n-$ chain is repeatedly used, the charge accumulates in the $-(CF_2)_n-$ chain to which the fluorine atom-containing resin particle adheres. Thus, the large potential fluctuation may occur.

The inventors have made an investigation, and as a result, have found that at the time of the incorporation of the dispersant having the $-(CF_2)_n-$ chain into the surface layer, when an oxygen atom is interposed into the $-(CF_2)_n-$ chain, a charge accumulation-suppressing effect is obtained. In addition, the inventors have found that as the number of the carbon atoms of a $-(CF_2)-$ chain that are continuous without through any oxygen atom increases, charge is more liable to accumulate in the $-(CF_2)_n-$ chain, and hence a fluctuation in potential of the photosensitive member is more liable to become larger.

In view of the foregoing, the inventors have made a further investigation, and as a result, have found that when the polymer A having the structural unit represented by the formula (1) is used as the dispersant having the $-(CF_2)_n-$ chain, the accumulation of the charge can be suppressed, and hence a fluctuation in potential of the photosensitive member at the time of its repeated use can be suppressed.

In the formula (1), $Rf^1$ represents a perfluoroalkylene group having 5 or less carbon atoms, or a perfluoroalkylidene group having 5 or less carbon atoms, and $Rf^2$ represents a perfluoroalkyl group having 5 or less carbon atoms. That is, the number of the carbon atoms of the $-(CF_2)-$ chain that are continuous without through any oxygen atom in the structural unit represented by the formula (1) is 5 or less. Thus, it is conceivable that the accumulation of charge in the structural unit represented by the formula (1) can be suppressed.

It is more preferred that "n" $Rf^1$s in the formula (1) each independently represent a perfluoroalkylene group having 1 to 3 carbon atoms, or a perfluoroalkylidene group having 1 to 3 carbon atoms, and $Rf^2$ therein represent a perfluoroalkyl group having 1 to 3 carbon atoms.

The total number of the carbon atoms of "n" $Rf^1$s and $Rf^2$ in the formula (1) is preferably from 6 to 9 from the viewpoints of improving the uniformity of the dispersion of the fluorine atom-containing resin particle and suppressing a potential fluctuation.

In addition, when $R^{12}$ in the formula (1) represents a single bond, a methylene group, or an ethylene group, a difference in surface energy between the structural unit represented by the formula (1) and the fluorine atom-containing resin particle reduces. Accordingly, the fluorine atom-containing resin particle may easily adhere to the structural unit represented by the formula (1) to enable a sufficient improvement in uniformity of the dispersion of the fluorine atom-containing resin particle in the surface layer. $R^{12}$ in the formula (1) preferably represents a methylene group.

In the present disclosure, examples of the structural unit represented by the formula (1) include structures shown in Table 1 and Table 2. In each of Table 1 and Table 2, a plurality of $Rf^1$s were represented by $Rf^{1-1}$, $Rf^{1-2}$ $Rf^{1-3}$, $Rf^{1-4}$ and $Rf^{1-5}$ in the stated order from a side close to the main chain of the polymer A (side distant from $Rf^2$ at the terminal thereof).

TABLE 1

| Exemplified No. Structure | Structural unit represented by formula (1) | | | | | | | | | |
|---|---|---|---|---|---|---|---|---|---|---|
| | $R^{11}$ | $R^{12}$ | n | $Rf^{1-1}$ | $Rf^{1-2}$ | $Rf^{1-3}$ | $Rf^{1-4}$ | $Rf^{1-5}$ | $Rf^{2}$ | Total number of carbon atoms of $Rf^{1-1}$ to $Rf^{1-5}$ and $Rf^{2}$ |
| (1-1) | —H | Single bond | 3 | $—CF_2—$ | $—CF_2—$ | $—CF_2—CF_2—$ | | | $—CF_2—CF_3$ | 6 |
| (1-2) | —CH | Single bond | 3 | $—CF_2—$ | $—CF_2—$ | $—CF_2—CF_2—$ | | | $—CF_2—CF_3$ | 6 |
| (1-3) | —H | $—CH_2—$ | 3 | $—CF_2—$ | $—CF_2—$ | $—CF_2—CF_2—$ | | | $—CF_2—CF_3$ | 6 |
| (1-4) | —CH | $—CH_2—$ | 3 | $—CF_2—$ | $—CF_2—$ | $—CF_2—CF_2—$ | | | $—CF_2—CF_3$ | 6 |
| (1-5) | —H | $—C_2H_4—$ | 3 | $—CF_2—$ | $—CF_2—$ | $—CF_2—CF_2—$ | | | $—CF_2—CF_3$ | 6 |
| (1-6) | —CH | $—C_2H_4—$ | 3 | $—CF_2—$ | $—CF_2—$ | $—CF_2—CF_2—$ | | | $—CF_2—CF_3$ | 6 |
| (1-7) | —H | Single bond | 3 | $—CF_2—$ | $—CF_2—$ | $—CF_2—$ | | | $—CF_2—CF_2—CF_3$ | 6 |
| (1-8) | —CH | Single bond | 3 | $—CF_2—$ | $—CF_2—$ | $—CF_2—$ | | | $—CF_2—CF_2—CF_3$ | 6 |
| (1-9) | —H | $—CH_2—$ | 3 | $—CF_2—$ | $—CF_2—$ | $—CF_2—$ | | | $—CF_2—CF_2—CF_3$ | 6 |
| (1-10) | —CH | $—CH_2—$ | 3 | $—CF_2—$ | $—CF_2—$ | $—CF_2—$ | | | $—CF_2—CF_2—CF_3$ | 6 |
| (1-11) | —H | $—C_2H_4—$ | 3 | $—CF_2—$ | $—CF_2—$ | $—CF_2—$ | | | $—CF_2—CF_2—CF_3$ | 6 |
| (1-12) | —CH | $—C_2H_4—$ | 3 | $—CF_2—$ | $—CF_2—$ | $—CF_2—$ | | | $—CF_2—CF_2—CF_3$ | 6 |
| (1-13) | —H | Single bond | 3 | $—CF_2—$ | $—CF_2—$ | —CF—<br>\|<br>$CF_3$ | | | $—CF_2—CF_2—CF_3$ | 7 |
| (1-14) | —CH | Single bond | 3 | $—CF_2—$ | $—CF_2—$ | —CF—<br>\|<br>$CF_3$ | | | $—CF_2—CF_2—CF_3$ | 7 |
| (1-15) | —H | $—CH_2—$ | 3 | $—CF_2—$ | $—CF_2—$ | —CF—<br>\|<br>$CF_3$ | | | $—CF_2—CF_2—CF_3$ | 7 |
| (1-16) | —CH | $—CH_2—$ | 3 | $—CF_2—$ | $—CF_2—$ | —CF—<br>\|<br>$CF_3$ | | | $—CF_2—CF_2—CF_3$ | 7 |
| (1-17) | —H | $—C_2H_4—$ | 3 | $—CF_2—$ | $—CF_2—$ | —CF—<br>\|<br>$CF_3$ | | | $—CF_2—CF_2—CF_3$ | 7 |
| (1-18) | —CH | $—C_2H_4—$ | 3 | $—CF_2—$ | $—CF_2—$ | —CF—<br>\|<br>$CF_3$ | | | $—CF_2—CF_2—CF_3$ | 7 |

TABLE 1-continued

| Exemplified No. Structure | Structural unit represented by formula (1) | | | | | | | | | Total number of carbon atoms of $Rf^{1-1}$ to $Rf^{1-5}$ and $Rf^2$ |
|---|---|---|---|---|---|---|---|---|---|---|
| | $R^{11}$ | $R^{12}$ | n | $Rf^{1-1}$ | $Rf^{1-2}$ | $Rf^{1-3}$ | $Rf^{1-4}$ | $Rf^{1-5}$ | $Rf^2$ | |
| (1-19) | —H | Single bond | 3 | $-CF_2-$ | $-CF_2-$ | $-CF_2-$ | | | $-CF_2-CF_2-CF_2-CF_3$ | 7 |
| (1-20) | —CH | Single bond | 3 | $-CF_2-$ | $-CF_2-$ | $-CF_2-$ | | | $-CF_2-CF_2-CF_2-CF_3$ | 7 |
| (1-21) | —H | $-CH_2-$ | 3 | $-CF_2-$ | $-CF_2-$ | $-CF_2-$ | | | | 7 |
| (1-22) | —CH | $-CH_2-$ | 3 | $-CF_2-$ | $-CF_2-$ | $-CF_2-$ | | | $-CF_2-CF_2-CF_2-CF_3$ | 7 |
| (1-23) | —H | $-C_2H_4-$ | 3 | $-CF_2-$ | $-CF_2-$ | $-CF_2-$ | | | | 7 |
| (1-24) | —CH | $-C_2H_4-$ | 3 | $-CF_2-$ | $-CF_2-$ | $-CF_2-$ | | | $-CF_2-CF_2-CF_2-CF_3$ | 7 |
| (1-25) | —H | Single bond | 3 | $-CF_2-CF_2-$ | $-CF_2-CF_2-$ | $-CF_2-CF_2-$ | | | $-CF_2-CF_3$ | 8 |
| (1-26) | —CH | Single bond | 3 | $-CF_2-CF_2-$ | $-CF_2-CF_2-$ | $-CF_2-CF_2-$ | | | $-CF_2-CF_3$ | 8 |
| (1-27) | —H | $-CH_2-$ | 3 | $-CF_2-CF_2-$ | $-CF_2-CF_2-$ | $-CF_2-CF_2-$ | | | $-CF_2-CF_3$ | 8 |
| (1-28) | —CH | $-CH_2-$ | 3 | $-CF_2-CF_2-$ | $-CF_2-CF_2-$ | $-CF_2-CF_2-$ | | | $-CF_2-CF_3$ | 8 |
| (1-29) | —H | $-C_2H_4-$ | 3 | $-CF_2-CF_2-$ | $-CF_2-CF_2-$ | $-CF_2-CF_2-$ | | | $-CF_2-CF_3$ | 8 |
| (1-30) | —CH | $-C_2H_4-$ | 3 | $-CF_2-CF_2-$ | $-CF_2-CF_2-$ | $-CF_2-CF_2-$ | | | $-CF_2-CF_3$ | 8 |
| (1-31) | —H | Single bond | 3 | $-CF_2-$ | $-CF_2-$ | $-CF_2-CF_2-CF_2-$ | | | $-CF_2-CF_2-CF_3$ | 8 |
| (1-32) | —CH | Single bond | 3 | $-CF_2-$ | $-CF_2-$ | $-CF_2-CF_2-CF_2-$ | | | $-CF_2-CF_2-CF_3$ | 8 |
| (1-33) | —H | $-CH_2-$ | 3 | $-CF_2-$ | $-CF_2-$ | $-CF_2-CF_2-CF_2-$ | | | $-CF_2-CF_2-CF_3$ | 8 |
| (1-34) | —CH | $-CH_2-$ | 3 | $-CF_2-$ | $-CF_2-$ | $-CF_2-CF_2-CF_2-$ | | | $-CF_2-CF_2-CF_3$ | 8 |
| (1-35) | —H | $-C_2H_4-$ | 3 | $-CF_2-$ | $-CF_2-$ | $-CF_2-CF_2-CF_2-$ | | | $-CF_2-CF_2-CF_3$ | 8 |
| (1-36) | —CH | $-C_2H_4-$ | 3 | $-CF_2-$ | $-CF_2-$ | $-CF_2-CF_2-CF_2-$ | | | $-CF_2-CF_2-CF_3$ | 8 |
| (1-37) | —H | Single bond | 3 | $-CF_2-$ | $-CF_2-$ | $-CF_2-$ | | | $-CF_2-CF_2-CF_2-CF_2-CF_3$ | 8 |
| (1-38) | —CH | Single bond | 3 | $-CF_2-$ | $-CF_2-$ | $-CF_2-$ | | | $-CF_2-CF_2-CF_2-CF_2-CF_3$ | 8 |
| (1-39) | —H | $-CH_2-$ | 3 | $-CF_2-$ | $-CF_2-$ | $-CF_2-$ | | | $-CF_2-CF_2-CF_2-CF_2-CF_3$ | 8 |
| (1-40) | —CH | $-CH_2-$ | 3 | $-CF_2-$ | $-CF_2-$ | $-CF_2-$ | | | $-CF_2-CF_2-CF_2-CF_2-CF_3$ | 8 |
| (1-41) | —H | $-C_2H_4-$ | 3 | $-CF_2-$ | $-CF_2-$ | $-CF_2-$ | | | $-CF_2-CF_2-CF_2-CF_2-CF_3$ | 8 |
| (1-42) | —CH | $-C_2H_4-$ | 3 | $-CF_2-$ | $-CF_2-$ | $-CF_2-$ | | | $-CF_2-CF_2-CF_2-CF_2-CF_3$ | 8 |
| (1-43) | —H | Single bond | 3 | $-CF-$<br>$CF_3$ | $-CF-$<br>$CF_3$ | $-CF-$<br>$CF_3$ | | | $-CF_2-CF_2-CF_3$ | 9 |
| (1-44) | —CH | Single bond | 3 | $-CF-$<br>$CF_3$ | $-CF-$<br>$CF_3$ | $-CF-$<br>$CF_3$ | | | $-CF_2-CF_2-CF_3$ | 9 |
| (1-45) | —H | $-CH_2-$ | 3 | $-CF-$<br>$CF_3$ | $-CF-$<br>$CF_3$ | $-CF-$<br>$CF_3$ | | | $-CF_2-CF_2-CF_3$ | 9 |

TABLE 1-continued
| Exemplified No. Structure | Structural unit represented by formula (1) | | | | | | | | | |
|---|---|---|---|---|---|---|---|---|---|---|
| | $R^{11}$ | $R^{12}$ | n | $Rf^{1-1}$ | $Rf^{1-2}$ | $Rf^{1-3}$ | $Rf^{1-4}$ | $Rf^{1-5}$ | $Rf^2$ | Total number of carbon atoms of $Rf^{1-1}$ to $Rf^{1-5}$ and $Rf^2$ |
| (1-46) | —CH | $—CH_2—$ | 3 | 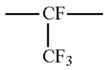 | 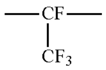 | 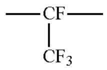 | | | $—CF_2—CF_2—CF_3$ | 9 |
| (1-47) | —H | $—C_2H_4—$ | 3 | 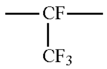 | 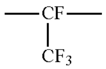 | 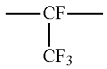 | | | $—CF_2—CF_2—CF_3$ | 9 |
| (1-48) | —CH | $—C_2H_4—$ | 3 | 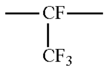 | 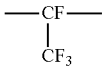 | 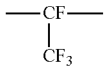 | | | $—CF_2—CF_2—CF_3$ | 9 |
| (1-49) | —H | Single bond | 3 | $—CF_2—$ | 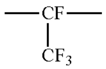 | 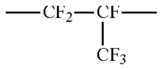 | | | $—CF_2—CF_2—CF_3$ | 9 |
| (1-50) | —CH | Single bond | 3 | $—CF_2—$ | 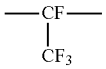 | 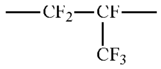 | | | $—CF_2—CF_2—CF_3$ | 9 |
| (1-51) | —H | $—CH_2—$ | 3 | $—CF_2—$ | 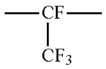 | 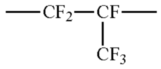 | | | $—CF_2—CF_2—CF_3$ | 9 |
| (1-52) | —CH | $—CH_2—$ | 3 | $—CF_2—$ | 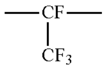 | 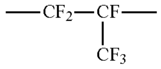 | | | $—CF_2—CF_2—CF_3$ | 9 |

TABLE 1-continued

| Exemplified No. Structure | Structural unit represented by formula (1) | | | | | | | | | |
|---|---|---|---|---|---|---|---|---|---|---|
| | $R^{11}$ | $R^{12}$ | n | $Rf^{1-1}$ | $Rf^{1-2}$ | $Rf^{1-3}$ | $Rf^{1-4}$ | $Rf^{1-5}$ | $Rf^2$ | Total number of carbon atoms of $Rf^{1-1}$ to $Rf^{1-5}$ and $Rf^2$ |
| (1-53) | $-H$ | $-C_2H_4-$ | 3 | $-CF_2-$ | 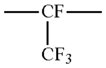 | 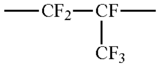 | | | $-CF_2-CF_2-CF_3$ | 9 |
| (1-54) | $-CH$ | $-C_2H_4-$ | 3 | $-CF_2-$ | 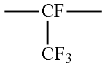 | 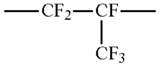 | | | $-CF_2-CF_2-CF_3$ | 9 |
| (1-55) | $-H$ | Single bond | 3 | $-CF_2-$ | $-CF_2-$ | $-CF_2-CF_2-$ | | | $-CF_2-CF_2-CF_2-CF_2-CF_3$ | 9 |
| (1-56) | $-CH$ | Single bond | 3 | $-CF_2-$ | $-CF_2-$ | $-CF_2-CF_2-$ | | | $-CF_2-CF_2-CF_2-CF_2-CF_3$ | 9 |
| (1-57) | $-H$ | $-CH_2-$ | 3 | $-CF_2-$ | $-CF_2-$ | $-CF_2-CF_2-$ | | | $-CF_2-CF_2-CF_2-CF_2-CF_3$ | 9 |
| (1-58) | $-CH$ | $-CH_2-$ | 3 | $-CF_2-$ | $-CF_2-$ | $-CF_2-CF_2-$ | | | $-CF_2-CF_2-CF_2-CF_2-CF_3$ | 9 |
| (1-59) | $-H$ | $-C_2H_4-$ | 3 | $-CF_2-$ | $-CF_2-$ | $-CF_2-CF_2-$ | | | $-CF_2-CF_2-CF_2-CF_2-CF_3$ | 9 |
| (1-60) | $-CH$ | $-C_2H_4-$ | 3 | $-CF_2-$ | $-CF_2-$ | $-CF_2-CF_2-$ | | | $-CF_2-CF_2-CF_2-CF_2-CF_3$ | 9 |

TABLE 2

| Exemplified No. Structure | Structural unit represented by formula (1) | | | | | | | | | Total number of carbon atoms of $Rf^{1-1}$ to $Rf^{1-5}$ and $Rf^2$ |
|---|---|---|---|---|---|---|---|---|---|---|
| | $R^{11}$ | $R^{12}$ | n | $Rf^{1-1}$ | $Rf^{1-2}$ | $Rf^{1-3}$ | $Rf^{1-4}$ | $Rf^{1-5}$ | $Rf^2$ | |
| (1-61) | $—H$ | Single bond | 4 | $—CF_2—$ | $—CF_2—$ | $—CF_2—$ | $—CF_2—$ | | $—CF_2—CF_3$ | 6 |
| (1-62) | $—CH_3$ | Single bond | 4 | $—CF_2—$ | $—CF_2—$ | $—CF_2—$ | $—CF_2—$ | | $—CF_2—CF_3$ | 6 |
| (1-63) | $—H$ | $—CH_2—$ | 4 | $—CF_2—$ | $—CF_2—$ | $—CF_2—$ | $—CF_2—$ | | $—CF_2—CF_3$ | 6 |
| (1-64) | $—CH_3$ | $—CH_2—$ | 4 | $—CF_2—$ | $—CF_2—$ | $—CF_2—$ | $—CF_2—$ | | $—CF_2—CF_3$ | 6 |
| (1-65) | $—H$ | $—C_2H_4—$ | 4 | $—CF_2—$ | $—CF_2—$ | $—CF_2—$ | $—CF_2—$ | | $—CF_2—CF_3$ | 6 |
| (1-66) | $—CH_3$ | $—C_2H_4—$ | 4 | $—CF_2—$ | $—CF_2—$ | $—CF_2—$ | $—CF_2—$ | | $—CF_2—CF_3$ | 6 |
| (1-67) | $—H$ | Single bond | 4 | $—CF_2—$ | $—CF_2—$ | $—CF_2—$ | $—CF_2—$ | | $—CF_2—CF_2—CF_3$ | 7 |
| (1-68) | $—CH_3$ | Single bond | 4 | $—CF_2—$ | $—CF_2—$ | $—CF_2—$ | $—CF_2—$ | | $—CF_2—CF_2—CF_3$ | 7 |
| (1-69) | $—H$ | $—CH_2—$ | 4 | $—CF_2—$ | $—CF_2—$ | $—CF_2—$ | $—CF_2—$ | | $—CF_2—CF_2—CF_3$ | 7 |
| (1-70) | $—CH_3$ | $—CH_2—$ | 4 | $—CF_2—$ | $—CF_2—$ | $—CF_2—$ | $—CF_2—$ | | $—CF_2—CF_2—CF_3$ | 7 |
| (1-71) | $—H$ | $—C_2H_4—$ | 4 | $—CF_2—$ | $—CF_2—$ | $—CF_2—$ | $—CF_2—$ | | $—CF_2—CF_2—CF_3$ | 7 |
| (1-72) | $—CH_3$ | $—C_2H_4—$ | 4 | $—CF_2—$ | $—CF_2—$ | $—CF_2—$ | $—CF_2—$ | | $—CF_2—CF_2—CF_3$ | 7 |
| (1-73) | $—H$ | Single bond | 4 | $—CF_2—$ | $—CF_2—$ | $—CF_2—$ | $—CF—$<br>$CF_3$ | | $—CF_2—CF_3$ | 7 |
| (1-74) | $—CH_3$ | Single bond | 4 | $—CF_2—$ | $—CF_2—$ | $—CF_2—$ | $—CF—$<br>$CF_3$ | | $—CF_2—CF_3$ | 7 |
| (1-75) | $—H$ | $—CH_2—$ | 4 | $—CF_2—$ | $—CF_2—$ | $—CF_2—$ | $—CF—$<br>$CF_3$ | | $—CF_2—CF_3$ | 7 |
| (1-76) | $—CH_3$ | $—CH_2—$ | 4 | $—CF_2—$ | $—CF_2—$ | $—CF_2—$ | $—CF—$<br>$CF_3$ | | $—CF_2—CF_3$ | 7 |
| (1-77) | $—H$ | $—C_2H_4—$ | 4 | $—CF_2—$ | $—CF_2—$ | $—CF_2—$ | $—CF—$<br>$CF_3$ | | $—CF_2—CF_3$ | 7 |
| (1-78) | $—CH_3$ | $—C_2H_4—$ | 4 | $—CF_2—$ | $—CF_2—$ | $—CF_2—$ | $—CF—$<br>$CF_3$ | | $—CF_2—CF_3$ | 7 |
| (1-79) | $—H$ | Single bond | 5 | $—CF_2—$ | $—CF_2—$ | $—CF_2—$ | $—CF_2—$ | $—CF_2—$ | $—CF_2—CF_3$ | 7 |

TABLE 2-continued

| Exemplified No. Structure | Structural unit represented by formula (1) | | | | | | | | | |
|---|---|---|---|---|---|---|---|---|---|---|
| | $R^{11}$ | $R^{12}$ | n | $Rf^{1-1}$ | $Rf^{1-2}$ | $Rf^{1-3}$ | $Rf^{1-4}$ | $Rf^{1-5}$ | $Rf^2$ | Total number of carbon atoms of $Rf^{1-1}$ to $Rf^{1-5}$ and $Rf^2$ |
| (1-80) | $-CH_3$ | Single bond | 5 | $-CF_2-$ | $-CF_2-$ | $-CF_2-$ | $-CF_2-$ | $-CF_2-$ | $-CF_2-CF_3$ | 7 |
| (1-81) | $-H$ | $-CH_2-$ | 5 | $-CF_2-$ | $-CF_2-$ | $-CF_2-$ | $-CF_2-$ | $-CF_2-$ | $-CF_2-CF_3$ | 7 |
| (1-82) | $-CH_3$ | $-CH_2-$ | 5 | $-CF_2-$ | $-CF_2-$ | $-CF_2-$ | $-CF_2-$ | $-CF_2-$ | $-CF_2-CF_3$ | 7 |
| (1-83) | $-H$ | $-C_2H_4-$ | 5 | $-CF_2-$ | $-CF_2-$ | $-CF_2-$ | $-CF_2-$ | $-CF_2-$ | $-CF_2-CF_3$ | 7 |
| (1-84) | $-CH_3$ | $-C_2H_4-$ | 5 | $-CF_2-$ | $-CF_2-$ | $-CF_2-$ | $-CF_2-$ | $-CF_2-$ | $-CF_2-CF_3$ | 7 |
| (1-85) | $-H$ | Single bond | 4 | $-CF_2-$ | $-CF_2-$ | $-CF_2-$ | $-CF_2-CF_2-$ | | $-CF_2-CF_2-CF_3$ | 8 |
| (1-86) | $-CH_3$ | Single bond | 4 | $-CF_2-$ | $-CF_2-$ | $-CF_2-$ | $-CF_2-CF_2-$ | | $-CF_2-CF_2-CF_3$ | 8 |
| (1-87) | $-H$ | $-CH_2-$ | 4 | $-CF_2-$ | $-CF_2-$ | $-CF_2-$ | $-CF_2-CF_2-$ | | $-CF_2-CF_2-CF_3$ | 8 |
| (1-88) | $-CH_3$ | $-CH_2-$ | 4 | $-CF_2-$ | $-CF_2-$ | $-CF_2-$ | $-CF_2-CF_2-$ | | $-CF_2-CF_2-CF_3$ | 8 |
| (1-89) | $-H$ | $-C_2H_4-$ | 4 | $-CF_2-$ | $-CF_2-$ | $-CF_2-$ | $-CF_2-CF_2-$ | | $-CF_2-CF_2-CF_3$ | 8 |
| (1-90) | $-CH_3$ | $-C_2H_4-$ | 4 | $-CF_2-$ | $-CF_2-$ | $-CF_2-$ | $-CF_2-CF_2-$ | | $-CF_2-CF_2-CF_3$ | 8 |
| (1-91) | $-H$ | Single bond | 5 | $-CF_2-$ | $-CF_2-$ | $-CF_2-$ | $-CF_2-$ | 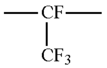 | $-CF_2-CF_3$ | 8 |
| (1-92) | $-CH_3$ | Single bond | 5 | $-CF_2-$ | $-CF_2-$ | $-CF_2-$ | $-CF_2-$ | 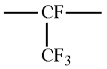 | $-CF_2-CF_3$ | 8 |
| (1-93) | $-H$ | $-CH_2-$ | 5 | $-CF_2-$ | $-CF_2-$ | $-CF_2-$ | $-CF_2-$ | 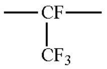 | $-CF_2-CF_3$ | 8 |
| (1-94) | $-CH_3$ | $-CH_2-$ | 5 | $-CF_2-$ | $-CF_2-$ | $-CF_2-$ | $-CF_2-$ | 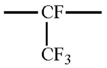 | $-CF_2-CF_3$ | 8 |
| (1-95) | $-H$ | $-C_2H_4-$ | 5 | $-CF_2-$ | $-CF_2-$ | $-CF_2-$ | $-CF_2-$ | 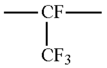 | $-CF_2-CF_3$ | 8 |
| (1-96) | $-CH_3$ | $-C_2H_4-$ | 5 | $-CF_2-$ | $-CF_2-$ | $-CF_2-$ | $-CF_2-$ | 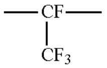 | $-CF_2-CF_3$ | 8 |
| (1-97) | $-H$ | Single bond | 4 | $-CF_2-$ | $-CF_2-$ | $-CF_2-$ | 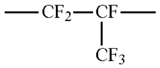 | | $-CF_2-CF_2-CF_3$ | 9 |

TABLE 2-continued

| Exemplified No. Structure | Structural unit represented by formula (1) | | | | | | | | | |
|---|---|---|---|---|---|---|---|---|---|---|
| | $R^{11}$ | $R^{12}$ | n | $Rf^{1-1}$ | $Rf^{1-2}$ | $Rf^{1-3}$ | $Rf^{1-4}$ | $Rf^{1-5}$ | $Rf^2$ | Total number of carbon atoms of $Rf^{1-1}$ to $Rf^{1-5}$ and $Rf^2$ |
| (1-98) | $-CH_3$ | Single bond | 4 | $-CF_2-$ | $-CF_2-$ | $-CF_2-$ | 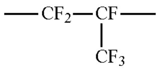 | | $-CF_2-CF_2-CF_3$ | 9 |
| (1-99) | $-H$ | $-CH_2-$ | 4 | $-CF_2-$ | $-CF_2-$ | $-CF_2-$ | 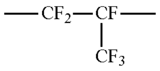 | | $-CF_2-CF_2-CF_3$ | 9 |
| (1-100) | $-CH_3$ | $-CH_2-$ | 4 | $-CF_2-$ | $-CF_2-$ | $-CF_2-$ | 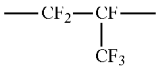 | | $-CF_2-CF_2-CF_3$ | 9 |
| (1-101) | $-H$ | $-C_2H_4-$ | 4 | $-CF_2-$ | $-CF_2-$ | $-CF_2-$ | 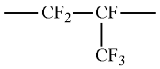 | | $-CF_2-CF_2-CF_3$ | 9 |
| (1-102) | $-CH_3$ | $-C_2H_4-$ | 4 | $-CF_2-$ | $-CF_2-$ | $-CF_2-$ | 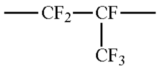 | | $-CF_2-CF_2-CF_3$ | 9 |
| (1-103) | $-H$ | Single bond | 5 | $-CF_2-$ | $-CF_2-$ | $-CF_2-$ | $-CF_2-CF_2-$ | $-CF_2-CF_2-$ | $-CF_2-CF_3$ | 9 |
| (1-104) | $-CH_3$ | Single bond | 5 | $-CF_2-$ | $-CF_2-$ | $-CF_2-$ | $-CF_2-CF_2-$ | $-CF_2-CF_2-$ | $-CF_2-CF_3$ | 9 |
| (1-105) | $-H$ | $-CH_2-$ | 5 | $-CF_2-$ | $-CF_2-$ | $-CF_2-$ | $-CF_2-CF_2-$ | $-CF_2-CF_2-$ | $-CF_2-CF_3$ | 9 |
| (1-106) | $-CH_3$ | $-CH_2-$ | 5 | $-CF_2-$ | $-CF_2-$ | $-CF_2-$ | $-CF_2-CF_2-$ | $-CF_2-CF_2-$ | $-CF_2-CF_3$ | 9 |
| (1-107) | $-H$ | $-C_2H_4-$ | 5 | $-CF_2-$ | $-CF_2-$ | $-CF_2-$ | $-CF_2-CF_2-$ | $-CF_2-CF_2-$ | $-CF_2-CF_3$ | 9 |
| (1-108) | $-CH_3$ | $-C_2H_4-$ | 5 | $-CF_2-$ | $-CF_2-$ | $-CF_2-$ | $-CF_2-CF_2-$ | $-CF_2-CF_2-$ | $-CF_2-CF_3$ | 9 |

In the polymer A, the constituent ratio of the structural unit represented by the formula (1) is preferably from 5 to 95 number % with respect to the total number of structural units for forming the polymer A from the viewpoint of improving the uniformity of the dispersion of the fluorine atom-containing resin particle in the surface layer. In addition, in the polymer A, the constituent ratio of the structural unit represented by the formula (1) is more preferably from 50 to 95 number %, still more preferably from 70 to 90 number % with respect to the total number of the structural units for forming the polymer A.

In addition, in the polymer A, the constituent ratio of the structural unit represented by the formula (1) is preferably from 0.1 to 80 mass % with respect to the total mass of structural units for forming the polymer A from the viewpoint of improving the uniformity of the dispersion of the fluorine atom-containing resin particle in the surface layer. In addition, in the polymer A, the constituent ratio of the structural unit represented by the formula (1) is more preferably from 1 to 80 mass %, still more preferably from 4 to 66 mass % with respect to the total mass of the structural units for forming the polymer A.

It is preferred that the polymer A further have a structural unit represented by the following formula (2):

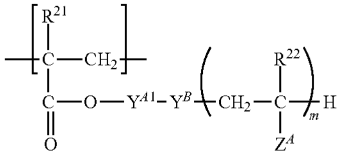

(2)

in the formula (2), $Y^{A1}$ represents an unsubstituted alkylene group, $Y^B$ represents an unsubstituted alkylene group, an alkylene group substituted with a halogen atom, an alkylene group substituted with a hydroxy group, an ester bond (—COO—), an amide bond (—NHCO—), or a urethane bond (—NHCOO—), or a divalent linking group that may be derived by combining one or more kinds selected from these groups and bonds, and —O— or —S—, or a single bond, $Z^A$ represents a structure represented by the formula (2A), a cyano group, or a phenyl group, $R^{21}$ and $R^{22}$ each independently represent a hydrogen atom or a methyl group, and "m" represents an integer of from 25 to 150;

(2A)

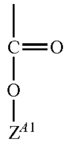

in the formula (2A), $Z^{A1}$ represents an alkyl group having 1 to 4 carbon atoms.

When $Y^B$ in the formula (2) represents an ester bond, $—Y^{A1}\text{-}Y^B—CH_2—$ may be any one of $—Y^{A1}—CO—O—CH_2—$ and $—Y^{A1}—O—CO—CH_2—$, and is preferably $—Y^{A1}—CO—O—CH_2—$. In addition, when $Y^B$ in the formula (2) represents an amide bond, $—Y^{A1}\text{-}Y^B—CH_2—$ may be any one of $—Y^{A1}—NH—CO—CH_2—$ and $—Y^{A1}—CO—NH—CH_2—$, and is preferably $—Y^{A1}—NH—CO—CH_2—$. In addition, when $Y^B$ in the formula (2) represents a urethane bond, $—Y^{A1}\text{-}Y^B—CH_2—$ may be any one of $—Y^{A1}—NH—CO—O—CH_2—$ and $—Y^{A1}—O—CO—NH—CH_2—$, and is preferably $—Y^{A1}—NH—COO—CH_2—$.

It is preferred that the polymer A have only the structural unit represented by the formula (1) and the structural unit represented by the formula (2) as structural units.

$—Y^{A1}\text{-}Y^B—$ in the formula (2) is more preferably a structure represented by $—Y^{A1}—(Y^{A2})_b—(Y^{A3})_c—(Y^{A4})_d—(Y^{A5})_e—(Y^{A6})_f—$ Here, $Y^{A1}$ represents an unsubstituted alkylene group, $Y^{A2}$ represents a methylene group substituted with at least one selected from the group consisting of: a hydroxy group; and a halogen atom, $Y^{A3}$ represents an unsubstituted alkylene group, $Y^{A4}$ represents an ester bond, an amide bond, or a urethane bond, $Y^{A5}$ represents an unsubstituted alkylene group, $Y^{A6}$ represents an oxygen atom or a sulfur atom, and "b", "c", "d", "e", and "f" each independently represent 0 or 1.

Examples of the structural unit represented by the formula (2) include structures shown in Table 3-1 and Table 3-2.

TABLE 3-1

| | Structural unit represented by formula (2) | | | | | | |
|---|---|---|---|---|---|---|---|
| No. | $R^{21}$ | $R^{22}$ | $Y^{A1}$ | $Y^B$ | $Z^A$ | $Z^{A1}$ | m |
| u2-1 | $—CH_3$ | $—CH_3$ | $—CH_2—$ | 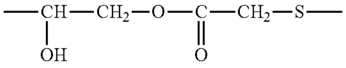 | Formula (2A) | $—CH_3$ | 60 |
| u2-2 | $—CH_3$ | $—CH_3$ | $—CH_2—$ | 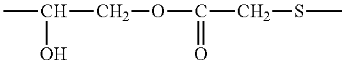 | Formula (2A) | $—CH_3$ | 25 |
| u2-3 | $—CH_3$ | $—CH_3$ | $—CH_2—$ | 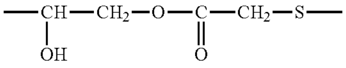 | Formula (2A) | $—CH_3$ | 150 |
| u2-4 | $—CH_3$ | —H | $—CH_2—$ | 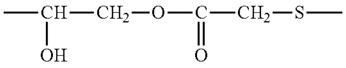 | Formula (2A) | $—CH_3$ | 60 |
| u2-5 | —H | $—CH_3$ | $—CH_2—$ | 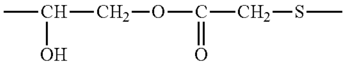 | Formula (2A) | $—CH_3$ | 60 |

TABLE 3-1-continued

| | Structural unit represented by formula (2) | | | | | | |
|---|---|---|---|---|---|---|---|
| No. | $R^{21}$ | $R^{22}$ | $Y^{A1}$ | $Y^B$ | $Z^A$ | $Z^{A1}$ | m |
| u2-6 | —H | —H | $—CH_2—$ | 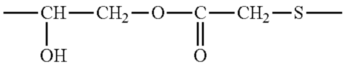 | Formula (2A) | $—CH_3$ | 60 |
| u2-7 | $—CH_3$ | $—CH_3$ | $—CH_2—CH_2—$ | 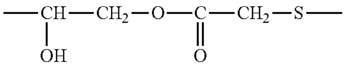 | Formula (2A) | $—CH_3$ | 60 |
| u2-8 | $—CH_3$ | $—CH_3$ | $—CH_2—$ | 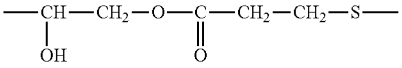 | Formula (2A) | $—CH_3$ | 60 |
| u2-9 | $—CH_3$ | $—CH_3$ | $—CH_2—CH_2—$ | 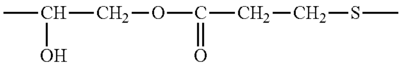 | Formula (2A) | $—CH_3$ | 60 |
| u2-10 | $—CH_3$ | $—CH_3$ | $—CH_2—$ | 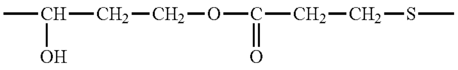 | Formula (2A) | $—CH_3$ | 60 |
| u2-11 | $—CH_3$ | $—CH_3$ | $—CH_2—CH_2—$ | 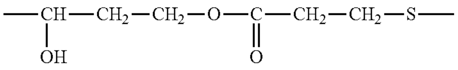 | Formula (2A) | $—CH_3$ | 60 |
| u2-12 | $—CH_3$ | $—CH_3$ | $—CH_2—$ | 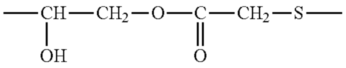 | Formula (2A) | $—CH_2—CH_3$ | 60 |
| u2-13 | $—CH_3$ | $—CH_3$ | $—CH_2—$ | 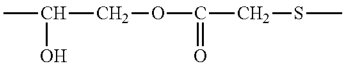 | Formula (2A) | $—CH_2CH_2CH_2CH_3$ | 60 |
| u2-14 | $—CH_3$ | —H | $—CH_2—$ | 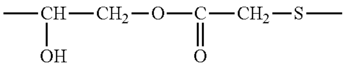 | Formula (2A) | $—CH_2CH_2CH_2CH_3$ | 60 |
| u2-15 | $—CH_3$ | $—CH_3$ | $—CH_2—$ | 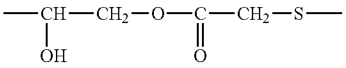 | Formula (2A) | $—CH_2CH(CH_3)_2$ | 60 |
| u2-16 | $—CH_3$ | —H | $—CH_2—$ | 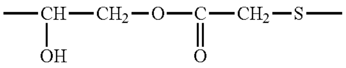 | Formula (2A) | $—CH_2CH(CH_3)_2$ | 60 |
| u2-17 | $—CH_3$ | $—CH_3$ | $—CH_2—$ | 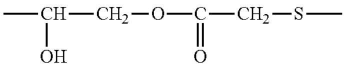 | Formula (2A) | $—C(CH_3)_3$ | 60 |
| u2-18 | $—CH_3$ | —H | $—CH_2—$ | 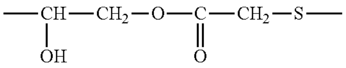 | Formula (2A) | $—C(CH_3)_3$ | 60 |
| u2-19 | $—CH_3$ | —H | $—CH_2—$ | 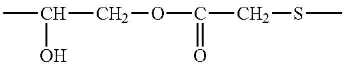 | Phenyl group | — | 60 |
| u2-20 | $—CH_3$ | —H | $—CH_2—$ | 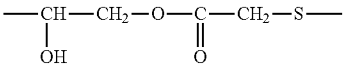 | Cyano group | — | 60 |

TABLE 3-2

| | Structural unit represented by formula (2) | | | | | | |
|---|---|---|---|---|---|---|---|
| No. | $R^{21}$ | $R^{22}$ | $Y^{A1}$ | $Y^{B}$ | $Z^{A}$ | $Z^{A1}$ | m |
| u2-21 | —$CH_3$ | —$CH_3$ | —$CH_2$—$CH_2$— | 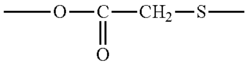 | Formula (2A) | —$CH_3$ | 60 |
| u2-22 | —$CH_3$ | —$CH_3$ | —$CH_2$—$CH_2$— | 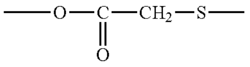 | Formula (2A) | —$CH_3$ | 60 |
| u2-23 | —H | —$CH_3$ | —$CH_2$—$CH_2$— | 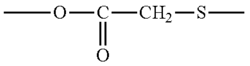 | Formula (2A) | —$CH_3$ | 60 |
| u2-24 | —$CH_3$ | —$CH_3$ | —$CH_2$— | 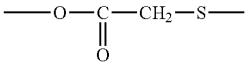 | Formula (2A) | —$CH_3$ | 60 |
| u2-25 | —$CH_3$ | —$CH_3$ | —$CH_2CH_2CH_2CH_2$— | 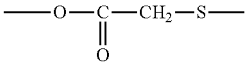 | Formula (2A) | —$CH_3$ | 60 |
| u2-26 | —$CH_3$ | —$CH_3$ | —$CH_2$—$CH_2$— | 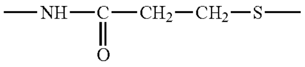 | Formula (2A) | —$CH_3$ | 60 |
| u2-27 | —H | —$CH_3$ | —$CH_2$—$CH_2$— | 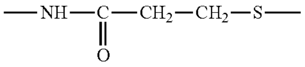 | Formula (2A) | —$CH_3$ | 60 |
| u2-28 | —$CH_3$ | —$CH_3$ | —$CH_2$—$CH_2$— | 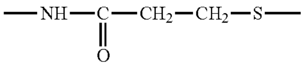 | Formula (2A) | —$CH_3$ | 60 |
| u2-29 | —$CH_3$ | —$CH_3$ | —$CH_2$—$CH_2$— | 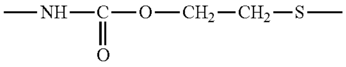 | Formula (2A) | —$CH_3$ | 60 |
| u2-30 | —H | —$CH_3$ | —$CH_2$—$CH_2$— | 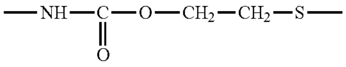 | Formula (2A) | —$CH_3$ | 60 |
| u2-31 | —$CH_3$ | —$CH_3$ | —$CH_2$—$CH_2$— | 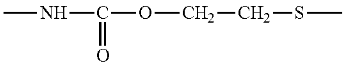 | Formula (2A) | —$CH_3$ | 60 |
| u2-32 | —$CH_3$ | —H | —$CH_2$—$CH_2$— | 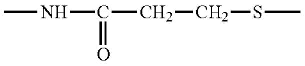 | Formula (2A) | —$CH_3$ | 60 |
| u2-33 | —H | —H | —$CH_2$—$CH_2$— | 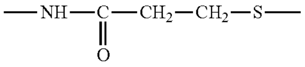 | Formula (2A) | —$CH_3$ | 60 |
| u2-34 | —$CH_3$ | —H | —$CH_2$—$CH_2$— | 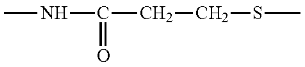 | Formula (2A) | —$CH_3$ | 60 |
| u2-35 | —$CH_3$ | —H | —$CH_2$—$CH_2$— | 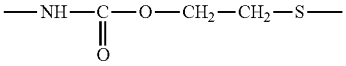 | Formula (2A) | —$CH_3$ | 60 |
| u2-36 | —H | —H | —$CH_2$—$CH_2$— | 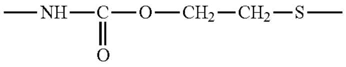 | Formula (2A) | —$CH_3$ | 60 |
| u2-37 | —$CH_3$ | —H | —$CH_2$—$CH_2$— | 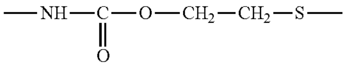 | Formula (2A) | —$CH_3$ | 60 |

In the polymer A, a ratio "content of the structural unit represented by the formula (1):content of the structural unit represented by the formula (2)" between the contents of the structural unit represented by the formula (1) and the structural unit represented by the formula (2) is preferably from 1:19 to 19:1 in terms of molar ratio. In addition, in the polymer A, the ratio between the contents of the structural unit represented by the formula (1) and the structural unit represented by the formula (2) is more preferably from 1:1 to 19:1 in terms of molar ratio, and is still more preferably from 7:3 to 9:1 in terms of molar ratio.

The weight-average molecular weight of the polymer A is preferably from 16,000 to 100,000 from the viewpoints of improving the uniformity of the dispersion of the fluorine atom-containing resin particle in the surface layer and suppressing a potential fluctuation. Further, the weight-average molecular weight of the polymer A is more preferably from 18,000 to 80,000.

The weight-average molecular weight of the polymer A may be measured and calculated by the following method.

(Measurement of Weight-Average Molecular Weight by GPC)

The weight-average molecular weight may be measured by gel permeation chromatography (GPC) as described below.

First, a sample is dissolved in tetrahydrofuran (TIF) at room temperature over 24 hours. Then, the resultant solution is filtered with a solvent-resistant membrane filter "Myshoridisk" (manufactured by Tosoh Corporation) having a pore diameter of 0.2 m to provide a sample solution. The concentration of a TiF-soluble component in the sample solution is adjusted to about 0.8 mass %. Measurement is performed with the sample solution under the following conditions.

Apparatus: HLC 8120 GPC (detector: RI) (manufactured by Tosoh Corporation)

Column: Septuplicate of Shodex KF-801, 802, 803, 804, 805, 806, and 807 (manufactured by Showa Denko K.K.)

Eluent: Tetrahydrofuran (THF)

Flow rate: 1.0 ml/min

Oven temperature: 40.0° C.

Sample injection amount: 0.10 ml

At the time of the calculation of the molecular weight of the sample, a molecular weight calibration curve produced by using a standard polystyrene resin is used. Examples of the standard polystyrene resin include products available under the product names "TSK Standard Polystyrenes F-850, F-450, F-288, F-128, F-80, F-40, F-20, F-10, F-4, F-2, F-1, A-5000, A-2500, A-1000, and A-500" (manufactured by Tosoh Corporation).

The content of the polymer A in the surface layer is preferably from 2 to 10 mass % with respect to the content of the fluorine atom-containing resin particle in the surface layer from the viewpoints of improving the uniformity of the dispersion of the fluorine atom-containing resin particle in the surface layer and suppressing a fluctuation in potential of the photosensitive member. In addition, the content of the polymer A in the surface layer is more preferably from 4 to 8 mass % with respect to the content of the fluorine atom-containing resin particle in the surface layer.

<Fluorine Atom-Containing Resin Particle>

The surface layer of the electrophotographic photosensitive member according to the present disclosure contains the fluorine atom-containing resin particle.

The content of the fluorine atom-containing resin particles in the surface layer is preferably from 5 to 40 mass % with respect to the total mass of the surface layer.

Examples of a resin in the fluorine atom-containing resin particle include a polytetrafluoroethylene resin, a polychlorotrifluoroethylene resin, a polytetrafluoroethylene propylene resin, a polyvinyl fluoride resin, a polyvinylidene fluoride resin, and a polydichlorodifluoroethylene resin. In addition, the fluorine atom-containing resin particle may contain a plurality of kinds of resins selected from the resins listed above. In addition, the fluorine atom-containing resin particles may be used alone or in combination thereof.

The fluorine atom-containing resin particle is preferably a polytetrafluoroethylene resin particle from the viewpoint of improving the uniformity of its dispersion in the surface layer.

The arithmetic average (average primary particle diameter) of the long diameters of the primary particles of the fluorine atom-containing resin particles is preferably from 150 to 300 nm from the viewpoints of improving the uniformity of their dispersion in the surface layer and suppressing a fluctuation in potential of the photosensitive member. In addition, the average primary particle diameter of the fluorine atom-containing resin particles is more preferably from 180 to 250 nm. Herein, the average primary particle diameter of the fluorine atom-containing resin particles is a value obtained through measurement from a secondary electron image obtained by observing a section of the surface layer with a scanning electron microscope.

The average of the circularities (average circularity) of the fluorine atom-containing resin particles is preferably 0.75 or more. Herein, the circularities are values calculated from areas and perimeters measured for the primary particles of the fluorine atom-containing resin particles in a secondary electron image obtained by observing a section of the surface layer with a scanning electron microscope.

The average primary particle diameter and average circularity of the fluorine atom-containing resin particles may be measured and calculated by the following methods.

(Methods of Measuring Average Primary Particle Diameter and Average Circularity)

The average particle diameter and average circularity of the fluorine atom-containing resin particles may be measured with a field emission scanning electron microscope (FE-SEM) as described below.

First, the fluorine atom-containing resin particles are caused to adhere to a commercial carbon electroconductive tape, and the fluorine atom-containing resin particles that do not adhere to the electroconductive tape are removed with compressed air, followed by the deposition of platinum from the vapor onto the remaining particles. Subsequently, the fluorine atom-containing resin particles having deposited thereonto platinum are observed with a FE-SEM manufactured by Hitachi High-Technologies Corporation (S-4700). Conditions for the measurement with the FE-SEM are as described below.

Acceleration voltage: 2 kV

WD: 5 mm

Magnification: 20,000

Number of pixels: 1,280 pixels in a longitudinal direction and 960 pixels in a lateral direction (size per pixel: 5 nm)

The Feret diameters of 100 particles are determined from the resultant image with ImageJ (open source software manufactured by the National Institutes of Health (NIH)), and their average is calculated and used as the average particle diameter.

In addition, the areas and perimeters of the particles are similarly determined, and the circularities thereof are determined from the following equation (II). The average of the circularities is calculated and used as the average circularity.

$$\text{Circularity}=4\times\pi\times(\text{area})/(\text{square of perimeter}) \quad \text{Equation (II)}$$

<Electrophotographic Photosensitive Member>

An example of the layer configuration of the electrophotographic photosensitive member according to the present disclosure is illustrated in FIG. 1. In the electrophotographic photosensitive member illustrated in FIG. 1, an undercoat layer 102, a charge generating layer 103, a charge transporting layer 104, and a surface layer 105 are laminated on a support 101. The photosensitive layer of the electrophotographic photosensitive member may include a laminate type photosensitive layer including the charge generating layer 103 and the charge transporting layer 104 as illustrated in FIG. 1, or may include a monolayer type photosensitive layer containing both of a charge generating substance and a charge transporting substance.

The surface layer of the electrophotographic photosensitive member according to the present disclosure contains the fluorine atom-containing resin particle, the binder material, and the polymer A having the structural unit represented by the formula (1).

As a method of producing the electrophotographic photosensitive member according to the present disclosure, there is given a method involving preparing coating liquids for respective layers to be described later, sequentially applying the coating liquids for desired layers, and drying the coating liquids. In particular, the method of producing the electrophotographic photosensitive member according to the present disclosure is a method of producing an electrophotographic photosensitive member including a surface layer, the method including the following two steps. One of the steps is a step of preparing a coating liquid for a surface layer containing a polymer A having a structural unit represented by the formula (1), a fluorine atom-containing resin particle, and at least one selected from a binder material and a raw material for the binder material. In addition, the other one is a step of forming the surface layer by forming a coating film of the coating liquid for a surface layer, and subjecting the coating film to at least one treatment selected from drying and curing.

As a method of applying the coating liquids, there are given, for example, dip coating, spray coating, inkjet coating, roll coating, die coating, blade coating, curtain coating, wire bar coating, and ring coating. Of those, dip coating is preferred from the viewpoints of efficiency and productivity.

The configuration of the electrophotographic photosensitive member according to the present disclosure is described below.

<Support>

The support of the electrophotographic photosensitive member is preferably a support having electroconductivity (electroconductive support). In addition, examples of the shape of the support include a cylindrical shape, a belt shape, and a sheet shape. Of those, a cylindrical support is preferred. In addition, the surface of the support may be subjected to, for example, electrochemical treatment such as anodization, blast treatment, or cutting treatment.

A metal, a resin, glass, or the like is preferred as a material for the support.

Examples of the metal include aluminum, iron, nickel, copper, gold, stainless steel, and alloys thereof. Of those, an aluminum support using aluminum is preferred.

In addition, electroconductivity is preferably imparted to the resin or the glass through treatment involving, for example, mixing or coating the resin or the glass with an electroconductive material.

<Electroconductive Layer>

An electroconductive layer may be arranged on the support. The arrangement of the electroconductive layer can conceal flaws and unevenness in the surface of the support, and control the reflection of light on the surface of the support.

The electroconductive layer preferably contains an electroconductive particle and a resin.

A material for the electroconductive particle is, for example, a metal oxide, a metal, or carbon black.

Examples of the metal oxide include zinc oxide, aluminum oxide, indium oxide, silicon oxide, zirconium oxide, tin oxide, titanium oxide, strontium titanate, magnesium oxide, antimony oxide, and bismuth oxide. Examples of the metal include aluminum, nickel, iron, nichrome, copper, zinc, and silver.

Of those, a metal oxide particle is preferably used as the electroconductive particle, and in particular, a titanium oxide particle, a tin oxide particle, or a zinc oxide particle are more preferably used.

When the metal oxide particle is used as the electroconductive particle, the surface of the metal oxide particle may be treated with a silane coupling agent or the like, or the metal oxide particle may be doped with an element, such as phosphorus or aluminum, or an oxide thereof.

In addition, the electroconductive particle may be of a laminated configuration having a core particle and a coating layer coating the particle. Examples of the core particle include a titanium oxide particle, a barium sulfate particle, and a zinc oxide particle. The coating layer is, for example, a metal oxide particle such as a tin oxide particle.

In addition, when the metal oxide particle is used as the electroconductive particle, its volume-average particle diameter is preferably from 1 to 500 nm, more preferably from 3 to 400 nm.

Examples of the resin include a polyester resin, a polycarbonate resin, a polyvinyl acetal resin, an acrylic resin, a silicone resin, an epoxy resin, a melamine resin, a polyurethane resin, a phenol resin, and an alkyd resin.

In addition, the electroconductive layer may further contain a concealing agent, such as a silicone oil, a resin particle, or titanium oxide.

The electroconductive layer may be formed by preparing a coating liquid for an electroconductive layer containing the above-mentioned materials and a solvent, forming a coating film thereof on the support, and drying the coating film. Examples of the solvent to be used for the coating liquid for an electroconductive layer include an alcohol-based solvent, a sulfoxide-based solvent, a ketone-based solvent, an ether-based solvent, an ester-based solvent, and an aromatic hydrocarbon-based solvent. A dispersion method for dispersing the electroconductive particle in the coating liquid for an electroconductive layer is, for example, a method involving using a paint shaker, a sand mill, a ball mill, or a liquid collision type high-speed disperser.

The thickness of the electroconductive layer is preferably from 1 to 50 μm, particularly preferably from 3 to 40 μm.

<Undercoat Layer>

In the present disclosure, the undercoat layer may be arranged on the support or the electroconductive layer. The arrangement of the undercoat layer can improve an adhesive function between layers to impart a charge injection-inhibiting function.

The undercoat layer preferably contains a resin. In addition, the undercoat layer may be formed as a cured film by polymerizing a composition containing a monomer having a polymerizable functional group.

Examples of the resin include a polyester resin, a polycarbonate resin, a polyvinyl acetal resin, an acrylic resin, an epoxy resin, a melamine resin, a polyurethane resin, a phenol resin, a polyvinyl phenol resin, an alkyd resin, a polyvinyl alcohol resin, a polyethylene oxide resin, a polypropylene oxide resin, a polyamide resin, a polyamic acid resin, a polyimide resin, a polyamide imide resin, and a cellulose resin.

Examples of the polymerizable functional group of the monomer having a polymerizable functional group include an isocyanate group, a blocked isocyanate group, a methylol group, an alkylated methylol group, an epoxy group, a metal alkoxide group, a hydroxy group, an amino group, a carboxy group, a thiol group, a carboxylic acid anhydride group, and a carbon-carbon double bond group.

In addition, the undercoat layer may further contain an electron transporting substance, a metal oxide particle, a metal particle, an electroconductive polymer, and the like for the purpose of improving electric characteristics. Of those, an electron transporting substance and a metal oxide particle are preferably used.

Examples of the electron transporting substance include a quinone compound, an imide compound, a benzimidazole compound, a cyclopentadienylidene compound, a fluorenone compound, a xanthone compound, a benzophenone compound, a cyanovinyl compound, a halogenated aryl compound, a silole compound, and a boron-containing compound. An electron transporting substance having a polymerizable functional group may be used as the electron transporting substance and copolymerized with the above-mentioned monomer having a polymerizable functional group to form the undercoat layer as a cured film.

Examples of the metal oxide particle include particles of indium tin oxide, tin oxide, indium oxide, titanium oxide, strontium titanate, zinc oxide, and aluminum oxide. A particle of silicon dioxide may also be used. Examples of the metal particle include particles of gold, silver, and aluminum.

The metal oxide particle to be incorporated into the undercoat layer may be subjected to surface treatment with a surface treatment agent such as a silane coupling agent before use.

A general method is used as a method of subjecting the metal oxide particle to the surface treatment. Examples thereof include a dry method and a wet method.

The dry method involves, while stirring the metal oxide particle in a mixer capable of high-speed stirring such as a Henschel mixer, adding an alcoholic aqueous solution, organic solvent solution, or aqueous solution containing the surface treatment agent, uniformly dispersing the mixture, and then drying the dispersion.

In addition, the wet method involves stirring the metal oxide particle and the surface treatment agent in a solvent, or dispersing the metal oxide particle and the surface treatment agent in a solvent with a sand mill or the like using glass beads or the like. After the dispersion, the solvent is removed by filtration or evaporation under reduced pressure. After the removal of the solvent, it is preferred to further perform baking at 100° C. or more.

The undercoat layer may further contain an additive, and for example, may contain a known material, such as: a metal particle such as an aluminum particle; an electroconductive substance particle such as carbon black; a charge transporting substance; a metal chelate compound; or an organometallic compound.

The undercoat layer may be formed by preparing a coating liquid for an undercoat layer containing the above-mentioned materials and a solvent, forming a coating film thereof on the support or the electroconductive layer, and drying and/or curing the coating film.

Examples of the solvent to be used for the coating liquid for an undercoat layer include organic solvents, such as an alcohol, a sulfoxide, a ketone, an ether, an ester, an aliphatic halogenated hydrocarbon, and an aromatic compound. In the present disclosure, alcohol-based and ketone-based solvents are preferably used.

A dispersion method for preparing the coating liquid for an undercoat layer is, for example, a method involving using a homogenizer, an ultrasonic disperser, a ball mill, a sand mill, a roll mill, a vibration mill, an attritor, or a liquid collision type high-speed disperser.

The thickness of the undercoat layer is preferably from 0.1 to 50 μm, more preferably from 0.2 to 40 μm, particularly preferably from 0.3 to 30 μm.

<Photosensitive Layer>

The photosensitive layers of the electrophotographic photosensitive member are mainly classified into (1) a laminate type photosensitive layer and (2) a monolayer type photosensitive layer. (1) The laminate type photosensitive layer is a photosensitive layer having a charge generating layer containing a charge generating substance and a charge transporting layer containing a charge transporting substance. (2) The monolayer type photosensitive layer is a photosensitive layer containing both a charge generating substance and a charge transporting substance.

(1) Laminate Type Photosensitive Layer

The laminate type photosensitive layer has the charge generating layer and the charge transporting layer.

(1-1) Charge Generating Layer

The charge generating layer preferably contains the charge generating substance and a resin.

Examples of the charge generating substance include azo pigments, perylene pigments, polycyclic quinone pigments, indigo pigments, and phthalocyanine pigments. Of those, azo pigments and phthalocyanine pigments are preferred. Of the phthalocyanine pigments, an oxytitanium phthalocyanine pigment, a chlorogallium phthalocyanine pigment, and a hydroxygallium phthalocyanine pigment are preferred.

The content of the charge generating substance in the charge generating layer is preferably from 40 to 85 mass %, more preferably from 60 to 80 mass % with respect to the total mass of the charge generating layer.

Examples of the resin include a polyester resin, a polycarbonate resin, a polyvinyl acetal resin, a polyvinyl butyral resin, an acrylic resin, a silicone resin, an epoxy resin, a melamine resin, a polyurethane resin, a phenol resin, a polyvinyl alcohol resin, a cellulose resin, a polystyrene resin, a polyvinyl acetate resin, and a polyvinyl chloride resin. Of those, a polyvinyl butyral resin is more preferred.

In addition, the charge generating layer may further contain an additive, such as an antioxidant or a UV absorber. Specific examples thereof include a hindered phenol compound, a hindered amine compound, a sulfur compound, a phosphorus compound, and a benzophenone compound.

The charge generating layer may be formed by preparing a coating liquid for a charge generating layer containing the above-mentioned materials and a solvent, forming a coating film thereof on the undercoat layer, and drying the coating film. Examples of the solvent to be used for the coating liquid include an alcohol-based solvent, a sulfoxide-based solvent, a ketone-based solvent, an ether-based solvent, an ester-based solvent, and an aromatic hydrocarbon-based solvent.

The thickness of the charge generating layer is preferably from 0.1 to 1 μm, more preferably from 0.15 to 0.4 μm.

(1-2) Charge Transporting Layer

The charge transporting layer preferably contains the charge transporting substance and a resin serving as a binder material.

Examples of the charge transporting substance include a polycyclic aromatic compound, a heterocyclic compound, a hydrazone compound, a styryl compound, an enamine compound, a benzidine compound, a triarylamine compound, and a resin having a group derived from each of those substances. Of those, a triarylamine compound and a benzidine compound are preferred.

The content of the charge transporting substance in the charge transporting layer is preferably from 25 to 70 mass %, more preferably from 30 to 55 mass % with respect to the total mass of the charge transporting layer.

Examples of the resin include a polyester resin, a polycarbonate resin, an acrylic resin, and a polystyrene resin. Of those, a polycarbonate resin and a polyester resin are preferred. A polyarylate resin is particularly preferred as the polyester resin.

A content ratio (mass ratio) between the charge transporting substance and the resin is preferably from 4:10 to 20:10, more preferably from 5:10 to 12:10.

In the case where a protection layer to be described later is not arranged, the charge transporting layer serves as the surface layer. In this case, the charge transporting layer contains the fluorine atom-containing resin particle, the binder material, and the polymer A having the structural unit represented by the formula (1). In addition, the content of the fluorine atom-containing resin particle in the charge transporting layer is preferably from 5 to 40 mass % with respect to the total mass of the charge transporting layer from the viewpoints of improving the uniformity of the dispersion of the fluorine atom-containing resin particle and improving the abrasion resistance of the layer. In addition, the content of the fluorine atom-containing resin particle in the charge transporting layer is more preferably from 5 to 15 mass %, still more preferably from 7 to 10 mass %.

In particular, when the charge transporting layer is the surface layer, it is preferred that the binder material contain a thermoplastic resin, the surface layer further contain a charge transporting substance, and the thermoplastic resin be at least one resin selected from a polycarbonate resin and a polyarylate resin.

In addition, the charge transporting substance is preferably at least one compound selected from a compound represented by the following formula (4) and a compound represented by the following formula (5):

(4)

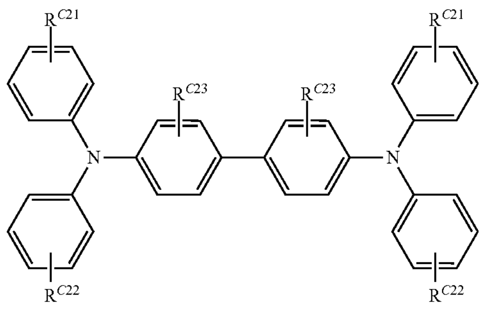

in the formula (4), $R^{C21}$, $R^{C22}$, and $R^{C23}$ each independently represent a hydrogen atom, a halogen atom, an alkyl group having 1 to 10 carbon atoms, an alkoxy group having 1 to 10 carbon atoms, or an aryl group having 6 to 10 carbon atoms, and two $R^{C21}$s, two $R^{C22}$s, or two $R^{C23}$s may be identical to or different from each other;

(5)

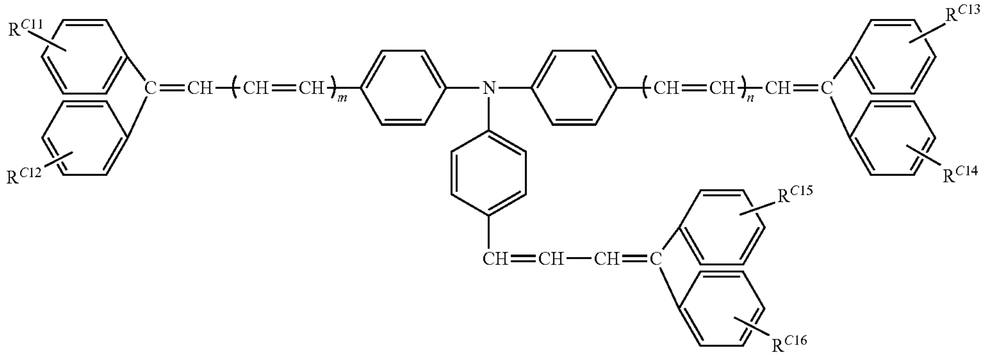

in the formula (5), $R^{C11}$, $R^{C12}$, $R_{C13}$, $R^{C14}$, $R^{C15}$, and $R^{C16}$ each independently represent a hydrogen atom, a halogen atom, an alkyl group having 1 to 20 carbon atoms, an alkoxy group having 1 to 20 carbon atoms, or an aryl group having 6 to 30 carbon atoms, or two adjacent substituents are bonded to each other to form a hydrocarbon ring structure, and "m" and "n" each independently represent 0, 1, or 2.

The charge transporting layer may contain an additive, such as an antioxidant, a UV absorber, a plasticizer, a leveling agent, a slipperiness imparting agent, or an abrasion resistance improver. Specific examples thereof include a hindered phenol compound, a hindered amine compound, a sulfur compound, a phosphorus compound, a benzophenone compound, a siloxane-modified resin, a silicone oil, a fluororesin particle, a polystyrene resin particle, a polyethylene resin particle, a silica particle, an alumina particle, and a boron nitride particle.

The charge transporting layer may be formed by preparing a coating liquid for a charge transporting layer containing the above-mentioned materials and a solvent, forming a coating film thereof on the charge generating layer, and drying the coating film. Examples of the solvent to be used for the coating liquid include an alcohol-based solvent, a ketone-based solvent, an ether-based solvent, an ester-based solvent, and an aromatic hydrocarbon-based solvent. Of those solvents, an ether-based solvent or an aromatic hydrocarbon-based solvent is preferred.

The thickness of the charge transporting layer is preferably from 5 to 50 μm, more preferably from 8 to 40 μm, particularly preferably from 10 to 30 μm.

(2) Monolayer Type Photosensitive Layer

The monolayer type photosensitive layer may be formed by preparing a coating liquid for a photosensitive layer containing the charge generating substance, the charge transporting substance, a resin, and a solvent, forming a coating film thereof on the undercoat layer, and drying the coating film. Examples of the charge generating substance, the charge transporting substance, and the resin are the same as those of the materials in the section "(1) Laminate Type Photosensitive Layer."

In the case where the protection layer to be described later is not arranged, the monolayer type photosensitive layer serves as the surface layer. In this case, the monolayer type photosensitive layer contains the fluorine atom-containing resin particle, the binder material, and the polymer A having the structural unit represented by the formula (1).

<Protection Layer>

In the present invention, a protection layer may be arranged on the photosensitive layer. The arrangement of the protection layer can improve durability.

In the case where the protection layer is arranged, the protection layer serves as the surface layer. In this case, the protection layer contains the fluorine atom-containing resin particle, the binder material, and the polymer A having the structural unit represented by the formula (1).

The protection layer may be formed as a cured film by polymerizing a composition containing a monomer having a polymerizable functional group. Here, the monomer having a polymerizable functional group is a raw material for the binder material, and a cured product of the monomer having a polymerizable functional group is the binder material to be incorporated into the protection layer. A reaction at the time of the polymerization of the composition containing the monomer having a polymerizable functional group is, for example, a thermal polymerization reaction, a photopolymerization reaction, or a radiation polymerization reaction. Examples of the polymerizable functional group of the monomer having a polymerizable functional group include an isocyanate group, a blocked isocyanate group, a methylol group, an alkylated methylol group, an epoxy group, a metal alkoxide group, a hydroxy group, an amino group, a carboxy group, a thiol group, a carboxylic acid anhydride group, and a group containing a carbon-carbon double bond. Here, examples of the group containing a carbon-carbon double bond include an acryloyl group and a methacryloyl group. A monomer having a charge transporting ability may be used as the monomer having a polymerizable functional group.

In the case where the protection layer is arranged, the protection layer serves as the surface layer of the electrophotographic photosensitive member. In this case, the protection layer contains the fluorine atom-containing resin particle, the binder material, and the polymer A having the structural unit represented by the formula (1).

The protection layer may contain an additive, such as an antioxidant, a UV absorber, a plasticizer, or a leveling agent. Specific examples of the additive include a hindered phenol compound, a hindered amine compound, a sulfur compound, a phosphorus compound, a benzophenone compound, a siloxane-modified resin, and a silicone oil.

The protection layer may be formed by preparing a coating liquid for a protection layer containing the above-mentioned materials and a solvent, forming a coating film thereof on the photosensitive layer, and drying and/or curing the coating film. Examples of the solvent to be used for the coating liquid include an alcohol-based solvent, a ketone-based solvent, an ether-based solvent, a sulfoxide-based solvent, an ester-based solvent, and an aromatic hydrocarbon-based solvent.

The thickness of the protection layer is preferably from 0.5 to 10 μm, more preferably from 1 to 7 μm.

A preferred embodiment of the protection layer is, for example, a case in which the binder material contains a cured product of a hole transportable compound having a polymerizable functional group.

The hole transportable compound having a polymerizable functional group is preferably at least one compound selected from a compound represented by the following formula (CT-1) and a compound represented by the following formula (CT-2):

(CT-1)

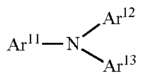

in the formula (CT-1), $Ar^{11}$ to $Ar^{13}$ each independently represent an aryl group that may have a substituent, and the substituent that the aryl group may have is an alkyl group having 1 to 6 carbon atoms, or a monovalent functional group represented by any one of the following formulae (P-1) to (P-3), provided that the compound represented by the formula (CT-1) has at least one aryl group having, as a substituent, a monovalent functional group represented by any one of the following formulae (P-1) to (P-3);

(CT-2)

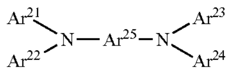

in the formula (CT-2), $Ar^{21}$ to $Ar^{24}$ each independently represent an aryl group that may have a substituent, and the substituent that the aryl group may have is an alkyl group having 1 to 6 carbon atoms, or a monovalent functional group represented by any one of the following formulae (P-1) to (P-3), and $Ar^{25}$ represents an arylene group that may have a substituent, and the substituent that the arylene group may have is an alkyl group having 1 to 6 carbon atoms, or a monovalent functional group represented by any one of the following formulae (P-1) to (P-3), provided that the compound represented by the formula (CT-2) has at least one group selected from an aryl group having, as a substituent, a monovalent functional group represented by any one of the following formulae (P-1) to (P-3), and an arylene group having, as a substituent, a monovalent functional group represented by any one of the following formulae (P-1) to (P-3);

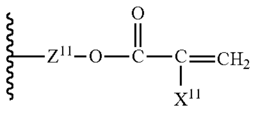

(P-1)

in the formula (P-1), $Z^{11}$ represents a single bond, or an alkylene group having 1 to 6 carbon atoms, and $X^{11}$ represents a hydrogen atom or a methyl group;

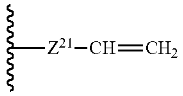

(P-2)

in the formula (P-2), $Z^{21}$ represents a single bond, or an alkylene group having 1 to 6 carbon atoms;

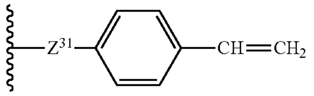

(P-3)

in the formula (P-3), $Z^{31}$ represents a single bond, or an alkylene group having 1 to 6 carbon atoms.

In the protection layer according to this embodiment, the content of the fluorine atom-containing resin particle in the protection layer is preferably from 5 to 40 mass % with respect to the total mass of the protection layer from the viewpoints of improving the uniformity of the dispersion of the fluorine atom-containing resin particle and improving the abrasion resistance of the layer. In addition, the content of the fluorine atom-containing resin particle in the protection layer is more preferably from 20 to 40 mass %, still more preferably from 25 to 35 mass %.

Another preferred embodiment of the protection layer is, for example, a case in which the binder material contains a cured product of: a charge transportable compound; and at least one kind of triazine compound selected from a guanamine compound and a melamine compound.

In the present disclosure, the charge transportable compound refers to a compound having an organic group derived from a compound having a charge transporting ability and at least one kind of polymerizable functional group.

Examples of the polymerizable functional group of the charge transportable compound include a hydroxy group (—OH), a methylol group (—$CH_2OH$), a methoxy group (—$OCH_3$), an amino group (—$NH_2$), a thiol group (—SH), and a carboxy group (—COOH).

The charge transportable compound preferably has at least one polymerizable functional group selected from a methylol group and a methoxy group out of those groups.

In the term "organic group derived from a compound having a charge transporting ability," the compound having a charge transporting ability is suitably, for example, an arylamine derivative. Examples of the arylamine derivative include a triphenylamine derivative and a tetraphenylbenzidine derivative.

Specific examples of the charge transportable compound include the following compounds.

C-1

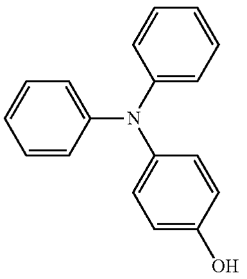

C-2

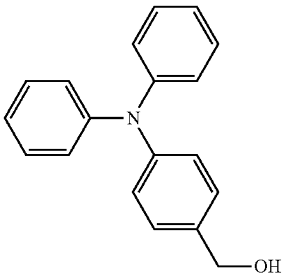

C-3

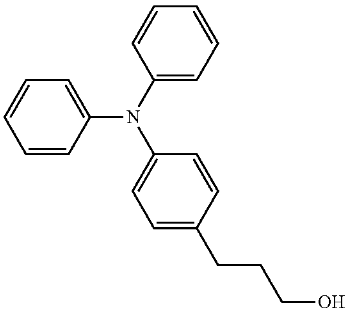

C-4

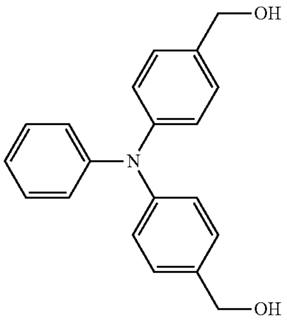

-continued
C-5
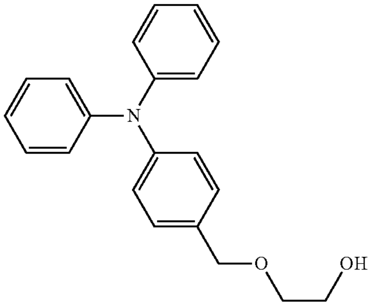
C-6
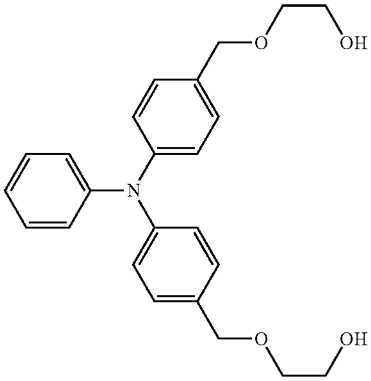
C-7
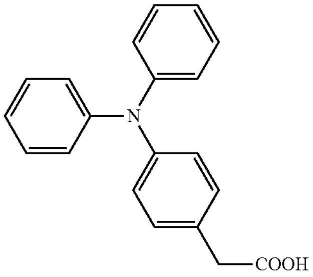
C-8
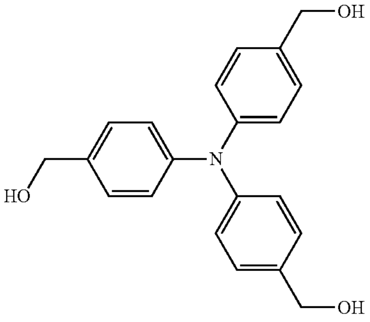
C-9
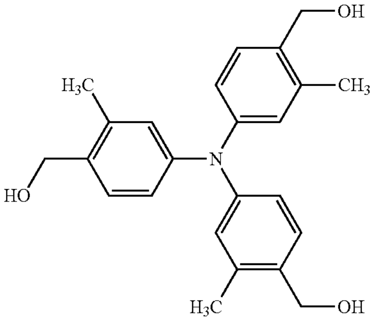
-continued
C-10
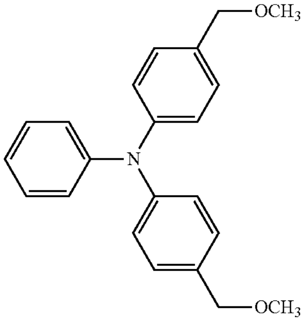
C-11
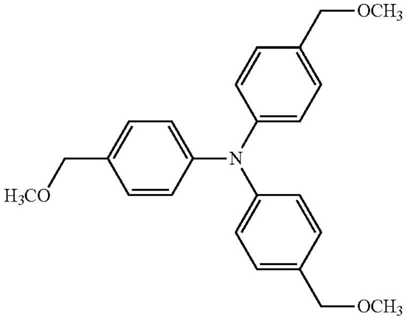
C-12
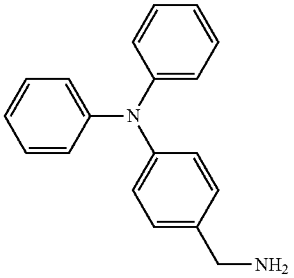
C-13
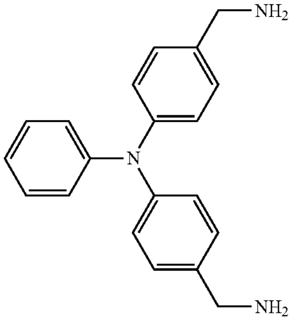
C-14
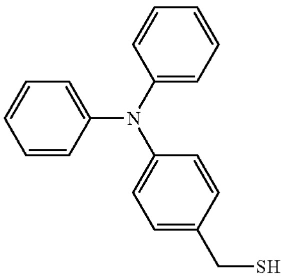

-continued
C-15
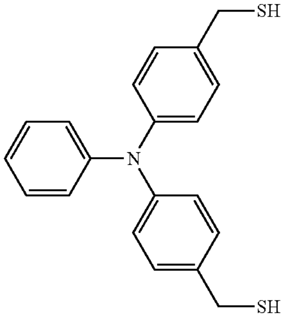
C-16
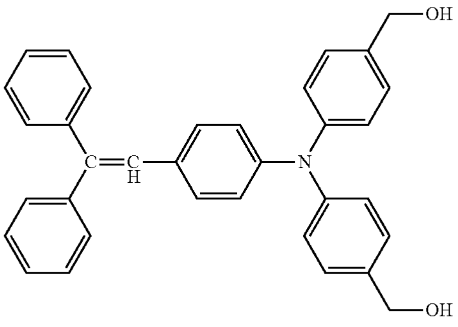
C-17
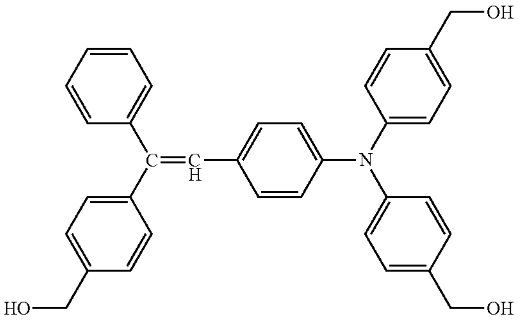
C-18
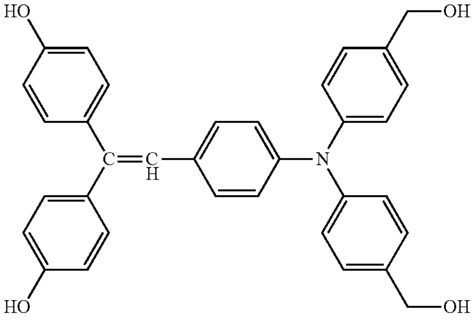
C-19
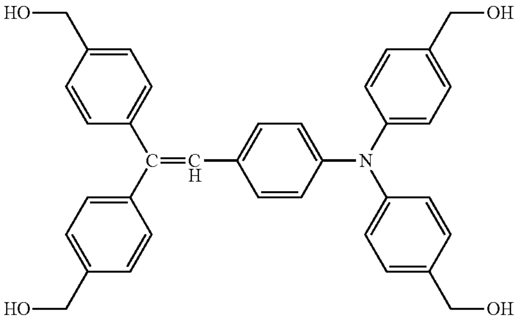
-continued
C-20
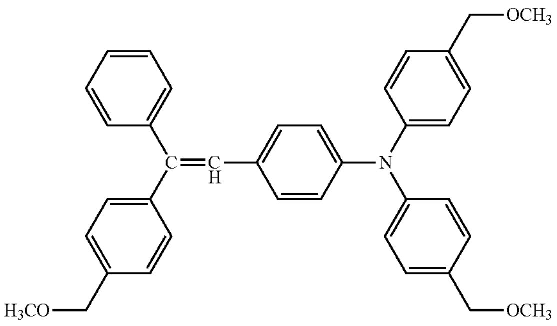
C-21
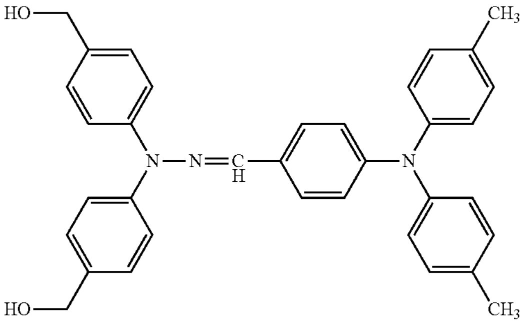
C-22
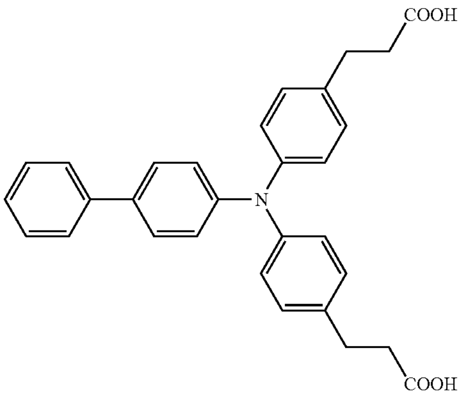
C-23
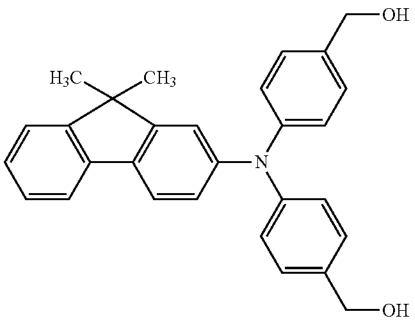

-continued
C-24
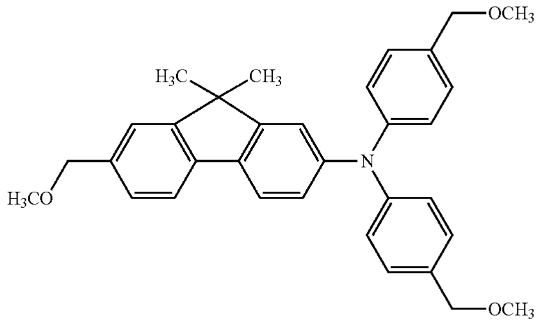
C-25
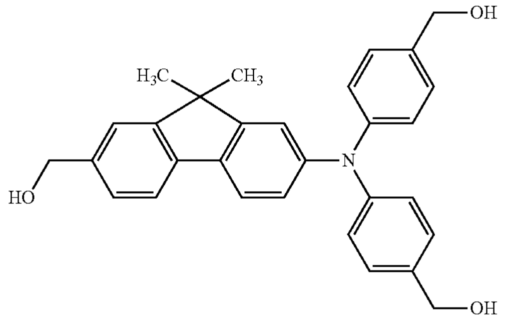
C-26
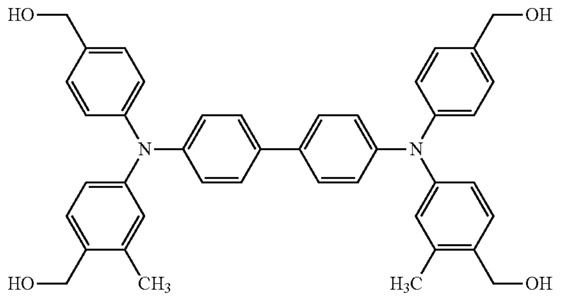
C-27
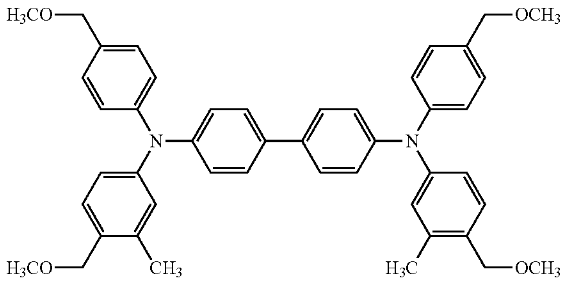
C-28
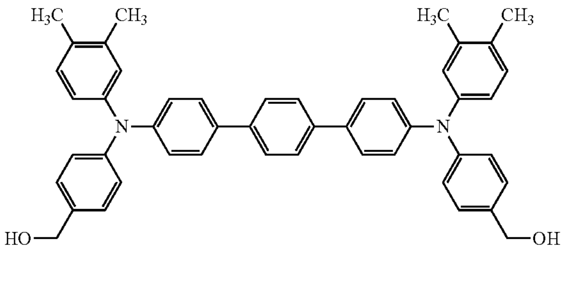
-continued
C-29
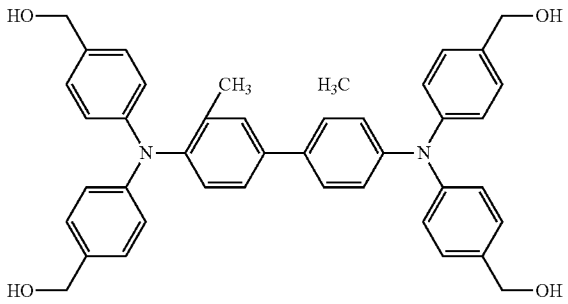
C-30
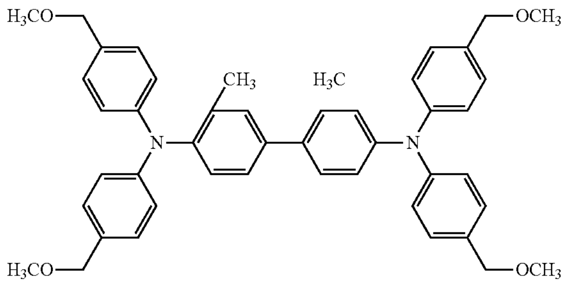
C-31
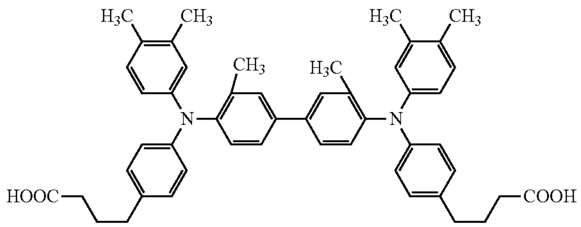
C-32
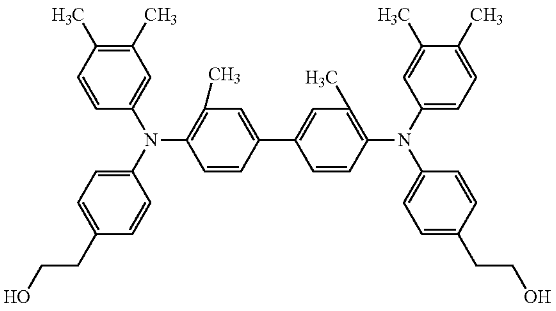
C-33
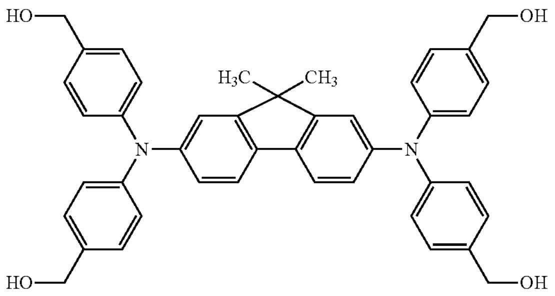

-continued

C-34

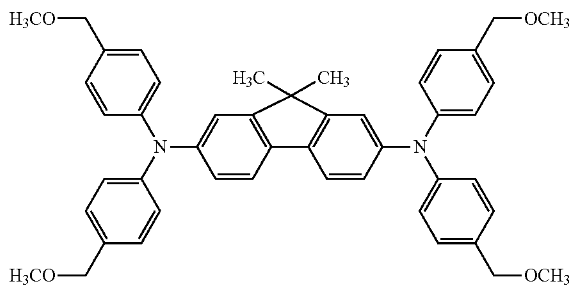

In particular, the protection layer preferably contains at least one kind of triazine compound selected from a guanamine compound represented by the following formula (A) and a melamine compound represented by the following formula (B):

(A)

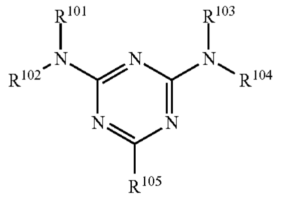

in the formula (A), $R^{101}$ to $R^{104}$ each independently represent a hydrogen atom, a hydroxymethyl group, or an alkoxymethyl group, and at least one of $R^{101}$ to $R^{104}$ represents a hydroxymethyl group or an alkoxymethyl group, $R^{105}$ represents an alkyl group that may have a substituent, a phenyl group that may have a substituent, or a cycloalkyl group that may have a substituent, and the substituent that the alkyl group, the phenyl group, and the cycloalkyl group each represented by $R^{105}$ may each have is an alkyl group or an alkoxy group;

(B)

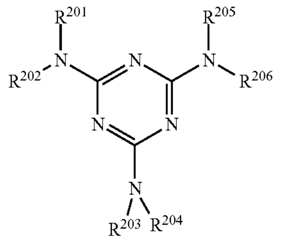

in the formula (B), $R^{201}$ to $R^{206}$ each independently represent a hydrogen atom, a hydroxymethyl group, an alkoxymethyl group, or an alkoxy group, and at least one of $R^{201}$ to $R^{206}$ represents a hydroxymethyl group, an alkoxymethyl group, or an alkoxy group.

When the protection layer contains at least one kind of triazine compound selected from the guanamine compound represented by the formula (A) and the melamine compound represented by the formula (B), its film strength is improved. Further, those compounds each have a nitrogen atom contributing to electron conveyability, and hence electron conveyability in the protection layer is improved.

The triazine compound means a compound containing a triazine ring, and in the case of the present invention, is a guanamine compound or a melamine compound.

A cured product of the charge transportable compound (a) and the triazine compound (b) to be incorporated into the protection layer is preferably a cured product obtained by causing the compounds to react with each other at a molar ratio "b:a" of from 1:3 to 1:300.

The ratio "b/a" is more preferably 1/100 or more from the viewpoint of the abrasion resistance of the surface layer, and the ratio "b/a" is more preferably 1/5 or less from the viewpoint of suppressing a fluctuation in potential of the photosensitive member due to its repeated use.

In the protection layer according to this embodiment, the content of the fluorine atom-containing resin particle in the protection layer is preferably from 5 to 40 mass % with respect to the total mass of the protection layer from the viewpoints of improving the uniformity of the dispersion of the fluorine atom-containing resin particle and improving the abrasion resistance of the layer. In addition, the content of the fluorine atom-containing resin particle in the protection layer is more preferably from 5 to 15 mass %, still more preferably from 7 to 12 mass %.

Commercially available products of the guanamine compound are, for example, SUPER BECKAMINE L-148-55, SUPER BECKAMINE 13-535, SUPER BECKAMINE L-145-60, and SUPER BECKAMINE TD-126 (each manufactured by DIC Corporation), and NIKALAC BL-60 and NIKALAC BX-4000 (each manufactured by SANWA Chemical Co., Ltd.).

Commercially available products of the melamine compound are, for example, Super Melami No. 90 (manufactured by NOF Corporation), SUPER BECKAMINE TD-139-60 (manufactured by DIC Corporation), U-VAN 2020 (manufactured by Mitsui Chemicals, Inc.), Sumitex Resin M-3 (manufactured by Sumitomo Chemical Co., Ltd.), and NIKALAC MW-30 (manufactured by SANWA Chemical Co., Ltd.).

<Surface Processing of Electrophotographic Photosensitive Member>

In the present disclosure, the surface processing of the electrophotographic photosensitive member may be performed. The performance of the surface processing can further stabilize the behavior of a cleaning unit (cleaning blade) to be brought into contact with the electrophotographic photosensitive member. A method for the surface processing is, for example, a method including bringing a mold having a convex portion into pressure contact with the surface of the electrophotographic photosensitive member to perform shape transfer, a method including imparting an uneven shape to the surface through mechanical polishing, or a method including causing powder to collide with the surface of the electrophotographic photosensitive member to roughen the surface. When a concave portion or a convex portion is arranged on the surface layer of the electrophotographic photosensitive member as described above, the behavior of the cleaning unit to be brought into contact with the electrophotographic photosensitive member can be further stabilized.

The above-mentioned concave portion or convex portion may be formed in the entire region of the surface of the electrophotographic photosensitive member, or may be formed on part of the surface of the electrophotographic photosensitive member. When the concave portion or the convex portion is formed on part of the surface of the electrophotographic photosensitive member, the concave portion or the convex portion is preferably formed in at least the entirety of the region of the photosensitive member to be brought into contact with the cleaning unit (cleaning blade).

When the concave portion is formed, the concave portion may be formed in the surface of the electrophotographic photosensitive member by bringing a mold having a convex portion corresponding to the concave portion into pressure contact with the surface of the electrophotographic photosensitive member to perform shape transfer.

<Polishing Tool to be Used in Mechanical Polishing>

A known unit may be utilized in the mechanical polishing. In general, a polishing tool is brought into abutment with the electrophotographic photosensitive member, and one, or each of both, of the polishing tool and the electrophotographic photosensitive member is relatively moved to polish the surface of the electrophotographic photosensitive member. The polishing tool is a polishing member obtained by arranging, on a substrate, a layer obtained by dispersing polishing abrasive grains in a binder resin.

Examples of the abrasive grains include particles of aluminum oxide, chromium oxide, diamond, iron oxide, cerium oxide, corundum, silica, silicon nitride, boron nitride, molybdenum carbide, silicon carbide, tungsten carbide, titanium carbide, and silicon oxide. The grain diameter of each of the abrasive grains is preferably from 0.01 to 50 μm, and is more preferably from 1 to 15 μm. When the grain diameter of each of the abrasive grains is excessively small, their polishing power weakens to make it difficult to increase the F/C ratio of the outermost surface of the electrophotographic photosensitive member. Those abrasive grains may be used alone or as a mixture thereof. When two or more kinds of the abrasive grains are mixed, their materials or grain diameters may be different from or identical to each other.

A thermoplastic resin, a thermosetting resin, a reactive resin, an electron beam-curable resin, a UV-curable resin, a visible light-curable resin, and an antifungal resin that are known may each be used as the binder resin in which the abrasive grains to be used in the polishing tool are dispersed. Examples of the thermoplastic resin include a vinyl chloride resin, a polyamide resin, a polyester resin, a polycarbonate resin, an amino resin, a styrene-butadiene copolymer, a urethane elastomer, and a polyamide-silicone resin. Examples of the thermosetting resin include a phenol resin, a phenoxy resin, an epoxy resin, a polyurethane resin, a polyester resin, a silicone resin, a melamine resin, and an alkyd resin. In addition, an isocyanate-based curing agent may be added to the thermoplastic resin.

The thickness of the layer of the polishing tool, which is obtained by dispersing the abrasive grains in the binder resin, is preferably from 1 to 100 μm. When the thickness is excessively large, thickness unevenness is liable to occur, and as a result, the unevenness of the surface roughness of a polishing target becomes a problem. Meanwhile, when the thickness is excessively small, the falling of the abrasive grains is liable to occur.

The shape of the substrate of the polishing tool is not particularly limited. Although a sheet-shaped substrate was used in each of Examples of the present disclosure for efficiently polishing a cylindrical electrophotographic photosensitive member, any other shape is permitted (the polishing tool of the present disclosure is hereinafter also described as "polishing sheet"). A material for the substrate of the polishing tool is also not particularly limited. A material for the sheet-shaped substrate is, for example, paper, a woven fabric, a nonwoven fabric, or a plastic film.

The polishing tool may be obtained by: mixing the abrasive grains and the binder resin described above, and a solvent capable of dissolving the binder resin to disperse the materials in the solvent; applying the resultant paint onto the substrate; and drying the paint.

<Polishing Apparatus>

Figure 2:
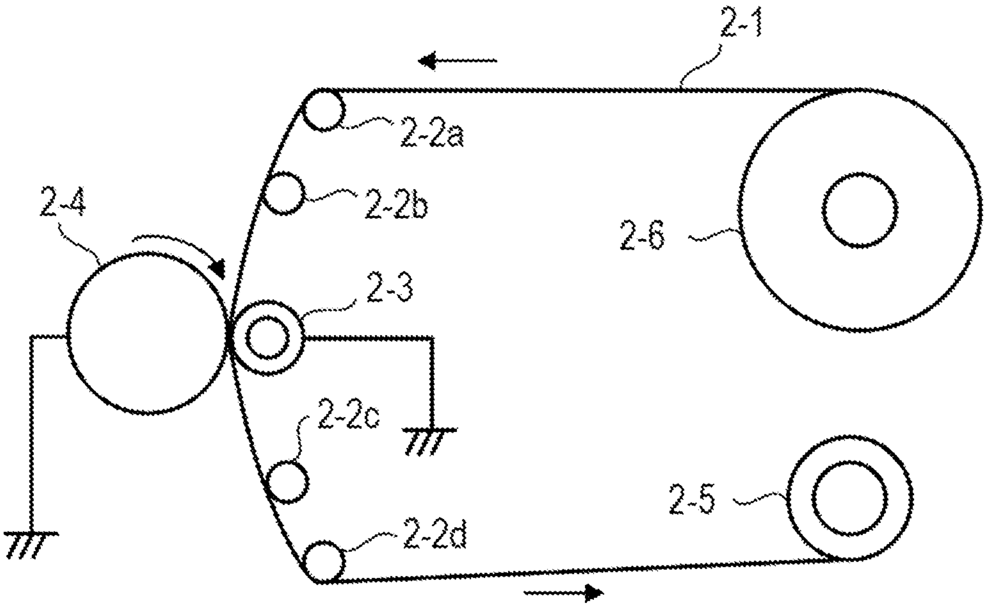
FIG. 2 is a view for illustrating an example of a polishing machine using a polishing sheet.

An example of a polishing apparatus for performing the surface processing of the electrophotographic photosensitive member is illustrated in FIG. 2.

FIG. 2 is an illustration of an apparatus for polishing a cylindrical electrophotographic photosensitive member with a polishing sheet. In FIG. 2, a polishing sheet 2-1 is wound around a hollow shaft 2-6, and a motor (not shown) is arranged so that a tension may be applied to the polishing sheet 2-1 in a direction opposite to the direction in which the polishing sheet 2-1 is fed to the shaft 2-6. The polishing sheet 2-1 is fed in a direction indicated by the arrow, and passes through a backup roller 2-3 via guide rollers 2-2*a* and 2-2*b*. The polishing sheet 2-1 after the polishing is taken up around a take-up unit 2-5 by the motor (not shown) via guide rollers 2-2*c* and 2-2*d*. The polishing is performed by bringing the polishing sheet 2-1 into pressure contact with a treatment target (electrophotographic photosensitive member before the performance of the polishing) 2-4 all the time. The polishing sheet 2-1 is often insulating, and hence a product connected to the ground or a product having electroconductivity is preferably used in a site with which the polishing sheet 2-1 is brought into contact.

The feeding speed of the polishing sheet 2-1 preferably falls within the range of from 10 to 1,000 mm/min. When the feeding amount thereof is small, the binder resin adheres to the surface of the polishing sheet 2-1, and a deep flaw resulting from the adhesion occurs in the surface of the treatment target 2-4 in some cases.

The treatment target 2-4 is placed at a position facing the backup roller 2-3 through the polishing sheet 2-1. The backup roller 2-3 is preferably an elastic body from the viewpoint of improving the uniformity of the surface roughness of the treatment target 2-4. At this time, the treatment target 2-4 and the backup roller 2-3 are pressed against each other through the polishing sheet 2-1 at a pressure of a desired preset value for a predetermined time period. Thus, the surface of the treatment target 2-4 is polished. The rotation direction of the treatment target 2-4 may be identical to the direction in which the polishing sheet 2-1 is fed, or may be opposite thereto. In addition, the rotation direction may be changed in the middle of the polishing.

The pressure at which the backup roller 2-3 is pressed against the treatment target 2-4 is preferably from 0.005 to 15 $N/m^2$, though the preferred value varies depending on the hardness of the backup roller 2-3 and a polishing time.

The surface roughness of the electrophotographic photosensitive member may be adjusted by appropriately selecting, for example, the feeding speed of the polishing sheet 2-1, the pressure at which the backup roller 2-3 is pressed against the treatment target, the kinds of the abrasive grains of the polishing sheet, the thickness of the binder resin of the polishing sheet, and the thickness of the substrate.

<Measurement of Maximum Height Rmax in JIS B0601 1982>

The surface roughness of the electrophotographic photosensitive member may be measured with a known unit.

Examples thereof include: a surface roughness meter such as a surface roughness measuring instrument SURFCORDER SE3500 manufactured by Kosaka Laboratory Ltd.; a non-contact three-dimensional surface measuring machine MICROMAP 557N manufactured by Ryoka Systems Inc.; and a microscope capable of obtaining a three-dimensional shape, such as an ultra-depth shape measuring microscope VK-8550 or VK-9000 manufactured by Keyence Corporation.

In the present disclosure, out of the indices of a surface roughness, a maximum height Rmax in JIS B0601 1982 specified by Japanese Industrial Standards (JIS) is used as a polishing depth L (μm). In addition, in the present disclosure, the Rmax is measured in advance for a 5-millimeter square section range of the electrophotographic photosensitive member to be cut out as a specimen for X-ray photoelectron spectroscopy to be described later. The measurement is performed at 3 arbitrary sites in the 5-millimeter square range, and the average of the measured values is adopted as the polishing depth L (μm).

<Process Cartridge and Electrophotographic Apparatus>

The electrophotographic photosensitive member according to the present disclosure may be one constituent for a process cartridge or an electrophotographic apparatus. The process cartridge according to the present disclosure integrally supports the electrophotographic photosensitive member described in the foregoing, and at least one unit selected from the group consisting of: a charging unit; a developing unit; and a cleaning unit, and is detachably attachable to the main body of an electrophotographic apparatus. In addition, the electrophotographic apparatus according to the present disclosure includes: the electrophotographic photosensitive member described in the foregoing; a charging unit; an exposing unit; a developing unit; and a transfer unit.

Figure 3:
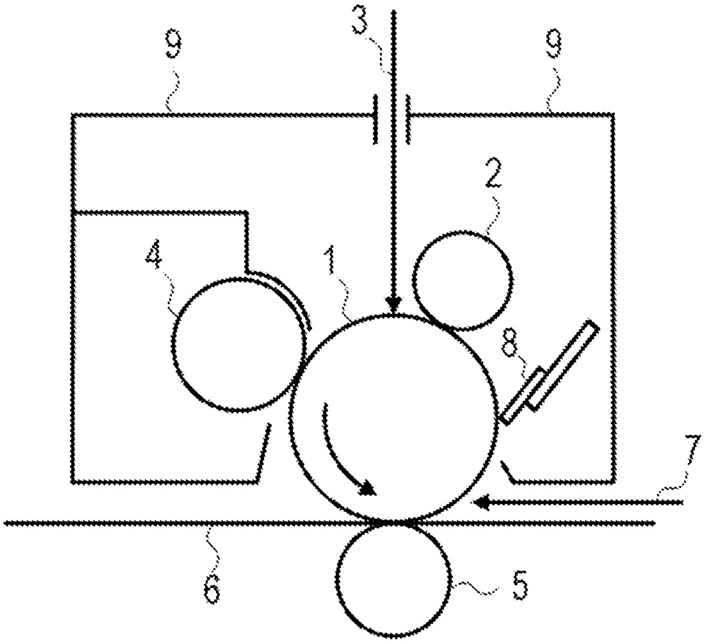
FIG. 3 is a schematic view for illustrating an example of a process cartridge including the electrophotographic photosensitive member.

An example of the configuration of the process cartridge according to the present disclosure is illustrated in FIG. 3. In FIG. 3, an electrophotographic photosensitive member 1 of a cylindrical shape is rotationally driven in a direction indicated by the arrow at a predetermined peripheral speed. The peripheral surface of the electrophotographic photosensitive member 1 to be rotationally driven is uniformly charged to a positive or negative predetermined potential by a charging unit 2. Next, the charged peripheral surface of the electrophotographic photosensitive member 1 receives exposure light (image exposure light) 3 emitted from an exposing unit (not shown), such as slit exposure or laser beam scanning exposure. Thus, electrostatic latent images corresponding to a target image are sequentially formed on the peripheral surface of the electrophotographic photosensitive member 1. Any one of a voltage obtained by superimposing an AC component on a DC component or a voltage formed only of a DC component may be used as a voltage to be applied to the charging unit (e.g., a charging roller) 2.

The electrostatic latent images formed on the peripheral surface of the electrophotographic photosensitive member 1 are developed with toner in the developer of a developing unit 4 to turn into toner images. Next, the toner images formed and carried on the peripheral surface of the electrophotographic photosensitive member 1 are sequentially transferred onto a transfer material (e.g., paper or an intermediate transfer member) 6 by a transfer bias from a transfer unit (e.g., a transfer roller) 5. The transfer material 6 is fed in sync with the rotation of the electrophotographic photosensitive member 1.

The surface of the electrophotographic photosensitive member 1 after the transfer of the toner images is subjected to electricity-removing treatment by pre-exposure light 7 from a pre-exposing unit (not shown). After that, transfer residual toner is removed from the surface by a cleaning unit 8, and hence the surface is cleaned. Thus, the electrophotographic photosensitive member 1 is repeatedly used in image formation. The electricity-removing treatment by the pre-exposing unit may be performed before the cleaning process or may be performed thereafter, and the pre-exposing unit is not necessarily required.

The electrophotographic photosensitive member 1 may be mounted on an electrophotographic apparatus, such as a copying machine or a laser beam printer. In addition, a process cartridge 9, which is formed by storing a plurality of constituents out of the constituents, such as the electrophotographic photosensitive member 1, the charging unit 2, the developing unit 4, and the cleaning unit 8, in a container, and integrally supporting the stored constituents, may be detachably attachable to the main body of the electrophotographic apparatus. In FIG. 3, the electrophotographic photosensitive member 1, the charging unit 2, the developing unit 4, and the cleaning unit 8 are integrally supported to form the process cartridge 9 detachably attachable to the main body of the electrophotographic apparatus.

Next, the electrophotographic apparatus including the electrophotographic photosensitive member of the present invention is described.

Figure 4:
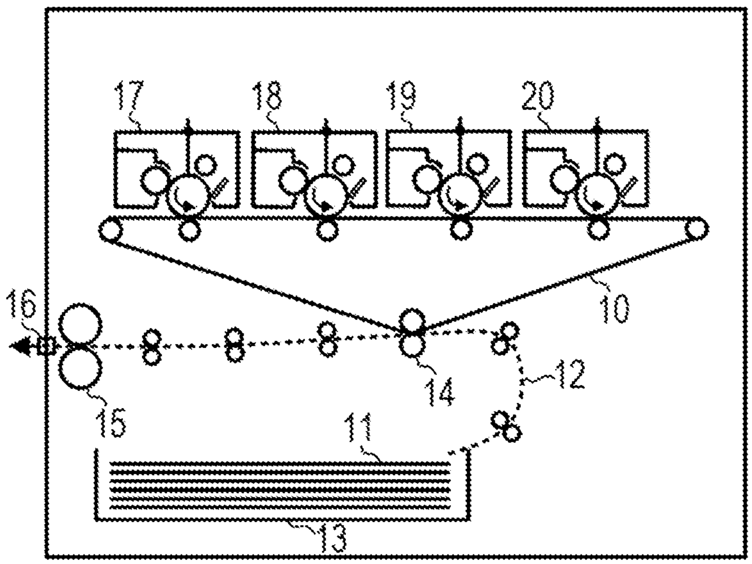
FIG. 4 is a schematic view for illustrating an example of an electrophotographic apparatus including the electrophotographic photosensitive member.

An example of the configuration of the electrophotographic apparatus according to the present disclosure is illustrated in FIG. 4. A process cartridge 17 for a yellow color, a process cartridge 18 for a magenta color, a process cartridge 19 for a cyan color, and a process cartridge 20 for a black color are juxtaposed along an intermediate transfer member 10. Those process cartridges correspond to a yellow color, a magenta color, a cyan color, and a black color, respectively. It is not necessarily required to unify the diameters and constituent materials of the electrophotographic photosensitive members, developers, charging systems, and the other units among the respective colors.

Once an image-forming operation starts, the toner images of the respective colors are sequentially superimposed on the intermediate transfer member 10 in accordance with the above-mentioned image-forming process. In parallel with the foregoing, a transfer sheet 11 is fed from a sheet-feeding tray 13 by a sheet-feeding path 12, and is fed to a secondary transfer unit 14 at the same timing as that of the rotation operation of the intermediate transfer member. The toner images on the intermediate transfer member 10 are transferred onto the transfer sheet 11 by a transfer bias from the secondary transfer unit 14. The toner images transferred onto the transfer sheet 11 are conveyed along the sheet-feeding path 12, and are fixed onto the transfer sheet by a fixing unit 15, followed by the discharge of the sheet from a sheet-discharging portion 16.

The electrophotographic photosensitive member according to the present disclosure may be used in, for example, a laser beam printer, an LED printer, a copying machine, a facsimile, and a multifunction machine thereof.

According to one aspect of the present disclosure, the electrophotographic photosensitive member, which is excellent in uniformity of the dispersion of the fluorine atom-containing resin particle in the surface layer, and is suppressed from causing a potential fluctuation at the time of its repeated use, is provided.

EXAMPLES

The present disclosure is described in more detail below by way of Examples and Comparative Examples, but is not limited thereto. In the description of Examples below, the term "part(s)" means "part(s) by mass" unless otherwise stated.

<Synthesis of Polymer a Having Structural Unit Represented by Formula (1)>

The polymer A having the structural unit represented by the formula (1) (hereinafter also represented as "graft copolymer") in the present disclosure was synthesized as described below. Acrylate compounds and a macromonomer compound used in the following synthesis examples may be produced with reference to, for example, Japanese Patent Application Laid-Open No. 2009-104145.

(Graft Copolymer 1)

The following materials were prepared.

| | |
|---|---|
| 2,2,3,3-Tetrafluoro-3-(1,1,2,2-tetrafluoro-2-(1,1,2,2-tetrafluoro-2-(perfluoropropoxy)ethoxy)ethoxy)propyl acrylate | 60 parts |
| Macromonomer represented by the following formula (D) (macromonomer AA-6) (number-average molecular weight: 6,000) | 75 parts |
| 1,1'-Azobis(1-acetoxy-1-phenylethane) (product name: OTAZO-15, manufactured by Otsuka Chemical Co., Ltd.) | 0.437 part |
| n-Butyl acetate | 338 parts |

Those materials were mixed in a glass-made flask including a stirring machine, a reflux condenser, a nitrogen gas-introducing tube, a thermostat, and a temperature gauge at 20° C. under a nitrogen atmosphere for 30 minutes. After that, the mixture was subjected to a reaction for 5 hours while being warmed so that the temperature of a reaction liquid became from 85 to 90° C. The reaction was stopped by ice cooling, and 1,500 parts by mass of 2-propanol was added to the reaction liquid to provide a precipitate. The precipitate was washed with a mixed solvent containing n-butyl acetate and 2-propanol at 1:5, and was dried at a temperature of 80° C. under a decompressed state of 1,325 Pa or less for 3 hours to provide a graft copolymer 1.

(D)

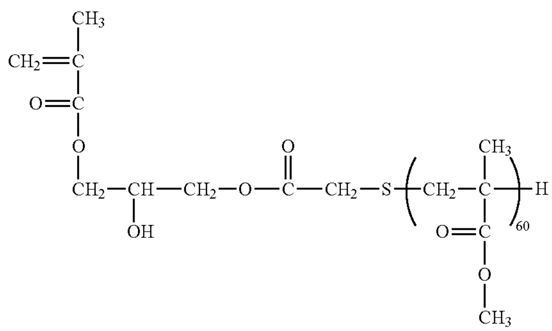

(Graft Copolymer 2)

In the synthesis of the graft copolymer 1, 60 parts of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 55 parts of 2-(difluoro(1,1,2,2,3,3-hexafluoro-3-(perfluoropropoxy)propoxy)methoxy)-2,2-difluoroethyl acrylate. A graft copolymer 2 was obtained in the same manner as in the graft copolymer 1 except the foregoing.

(Graft Copolymer 3)

In the synthesis of the graft copolymer 1, 60 parts of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 62 parts of 3,3,4,4-tetrafluoro-4-(1,1,2,2-tetrafluoro-2-(1,1,2,2-tetrafluoro-2-(perfluoropropoxy)ethoxy)ethoxy)butyl acrylate. A graft copolymer 3 was obtained in the same manner as in the graft copolymer 1 except the foregoing.

(Graft Copolymer 4)

In the synthesis of the graft copolymer 1, 60 parts of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 61 parts of 2-(difluoro(1,1,2,2-tetrafluoro-2-((perfluoropentyl)oxy)ethoxy)methoxy)-2,2-difluoroethyl acrylate. A graft copolymer 4 was obtained in the same manner as in the graft copolymer 1 except the foregoing.

(Graft Copolymer 5)

In the synthesis of the graft copolymer 1, 60 parts of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 45 parts of 2-((difluoro(perfluoropropoxy)methoxy)difluoromethoxy)-2,2-difluoroethyl acrylate. A graft copolymer 5 was obtained in the same manner as in the graft copolymer 1 except the foregoing.

(Graft Copolymer 6)

In the synthesis of the graft copolymer 1, the usage amount of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 30 parts. In addition, the usage amount of the macromonomer AA-6 was changed to 300 parts. A graft copolymer 6 was obtained in the same manner as in the graft copolymer 1 except the foregoing.

(Graft Copolymer 7)

In the synthesis of the graft copolymer 1, the usage amount of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 42 parts. In addition, the usage amount of the macromonomer AA-6 was changed to 180 parts. A graft copolymer 7 was obtained in the same manner as in the graft copolymer 1 except the foregoing.

(Graft Copolymer 8)

In the synthesis of the graft copolymer 1, the usage amount of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 68 parts. A graft copolymer 8 was obtained in the same manner as in the graft copolymer 1 except the foregoing.

(Graft Copolymer 9)

In the synthesis of the graft copolymer 1, the usage amount of 1,1'-azobis(1-acetoxy-1-phenylethane) was changed to 0.862 part. A graft copolymer 9 was obtained in the same manner as in the graft copolymer 1 except the foregoing.

(Graft Copolymer 10)

In the synthesis of the graft copolymer 1, the usage amount of 1,1'-azobis(1-acetoxy-1-phenylethane) was changed to 0.764 part. A graft copolymer 10 was obtained in the same manner as in the graft copolymer 1 except the foregoing.

(Graft Copolymer 11)

In the synthesis of the graft copolymer 1, the usage amount of 1,1'-azobis(1-acetoxy-1-phenylethane) was changed to 0.183 part. A graft copolymer 11 was obtained in the same manner as in the graft copolymer 1 except the foregoing.

(Graft Copolymer 12)

In the synthesis of the graft copolymer 1, the usage amount of 1,1'-azobis(1-acetoxy-1-phenylethane) was changed to 0.131 part. A graft copolymer 12 was obtained in the same manner as in the graft copolymer 1 except the foregoing.

(Graft Copolymer 13)

In the synthesis of the graft copolymer 1, the usage amount of 1,1'-azobis(1-acetoxy-1-phenylethane) was changed to 0.922 part. A graft copolymer 13 was obtained in the same manner as in the graft copolymer 1 except the foregoing.

(Graft Copolymer 14)

In the synthesis of the graft copolymer 1, the usage amount of 1,1'-azobis(1-acetoxy-1-phenylethane) was changed to 0.127 part. A graft copolymer 14 was obtained in the same manner as in the graft copolymer 1 except the foregoing.

(Graft Copolymer 15)

In the synthesis of the graft copolymer 1, the usage amount of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 24 parts. In addition, the usage amount of the macromonomer AA-6 was changed to 360 parts. A graft copolymer 15 was obtained in the same manner as in the graft copolymer 1 except the foregoing.

(Graft Copolymer 16)

In the synthesis of the graft copolymer 1, the usage amount of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 60 parts. In addition, the usage amount of the macromonomer AA-6 was changed to 30 parts. A graft copolymer 16 was obtained in the same manner as in the graft copolymer 1 except the foregoing.

(Graft Copolymer 17)

In the synthesis of the graft copolymer 1, 60 parts of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 40 parts of 2-((difluoro(perfluoroethoxy)methoxy)difluoromethoxy)-2,2-difluoroethyl acrylate. A graft copolymer 17 was obtained in the same manner as in the graft copolymer 1 except the foregoing.

(Graft Copolymer 18)

In the synthesis of the graft copolymer 1, 60 parts of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 65 parts of 2,2,3,3-tetrafluoro-3-(1,1,2,2-tetrafluoro-2-(1,1,2,3,3,3-hexafluoro-2-(perfluoropropoxy)propoxy)ethoxy)propyl acrylate. A graft copolymer 18 was obtained in the same manner as in the graft copolymer 1 except the foregoing.

(Graft Copolymer 19)

In the synthesis of the graft copolymer 1, 60 parts of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 59 parts of 2,2,3,3-tetrafluoro-3-(1,1,2,3,3,3-hexafluoro-2-(perfluorobutoxy)propoxy)propyl acrylate. A graft copolymer 19 was obtained in the same manner as in the graft copolymer 1 except the foregoing.

(Graft Copolymer 20)

In the synthesis of the graft copolymer 1,2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 2-((difluoro((perfluorohexyl)oxy)methoxy)difluoromethoxy)-2,2-difluoroethyl acrylate. A graft copolymer 20 was obtained in the same manner as in the graft copolymer 1 except the foregoing.

(Graft Copolymer 21)

In the synthesis of the graft copolymer 1, 60 parts of 2,2,3,3-tetrafluoro-3-(1,1,2,2-tetrafluoro-2-(1,1,2,2-tetrafluoro-2-(perfluoropropoxy)ethoxy)ethoxy)propyl acrylate was changed to 63 parts of 4,4,5,5-tetrafluoro-5-(1,1,2,2-tetrafluoro-2-(1,1,2,2-tetrafluoro-2-(perfluoropropoxy)ethoxy)ethoxy)pentyl acrylate. A graft copolymer 21 was obtained in the same manner as in the graft copolymer 1 except the foregoing.

The configurations and weight-average molecular weights of the resultant graft copolymers 1 to 21 are shown in Table 4. The weight-average molecular weights of the graft copolymers were calculated through the performance of measurement by GPC by the above-mentioned method. In Table 4, a plurality of $Rf^1$s were represented by $Rf^{1-1}$, $Rf^{1-2}$, and $Rf^{1-3}$ in the stated order from a side close to the main chain of each of the graft copolymers (side distant from $Rf^2$ at the terminal thereof).

TABLE 4

| Graft No. copoly-mer | Structural unit represented by formula (1) $R^{11}$ | n | $R^{12}$ | $Rf^{1-1}$ | $Rf^{1-2}$ | $Rf^{1-3}$ | $Rf^2$ | Total number of carbon atoms of $Rf^{1-1}$ to $Rf^{1-3}$ and $Rf^2$ | Weight-average molecular weight |
|---|---|---|---|---|---|---|---|---|---|
| 1 | —H | 3 | —$CH_2$— | —$CF_2$—$CF_2$— | —$CF_2$—$CF_2$— | —$CF_2$—$CF_2$— | —$CF_2$—$CF_2$—$CF_3$ | 9 | 33,515 |
| 2 | —H | 3 | —$CH_2$— | —$CF_2$— | —$CF_2$— | —$CF_2$—$CF_2$—$CF_2$— | —$CF_2$—$CF_2$—$CF_3$ | 8 | 32,276 |
| 3 | —H | 3 | —$CH_2$—$CH_2$— | —$CF_2$—$CF_2$— | —$CF_2$—$CF_2$— | —$CF_2$—$CF_2$— | —$CF_2$—$CF_2$—$CF_3$ | 9 | 33,862 |
| 4 | —H | 3 | —$CH_2$— | —$CF_2$— | —$CF_2$— | —$CF_2$—$CF_2$— | —$CF_2$—$CF_2$—$CF_2$—<br>$CF_2$—$CF_3$ | 9 | 33,614 |
| 5 | —H | 3 | —$CH_2$— | —$CF_2$— | —$CF_2$— | —$CF_2$— | —$CF_2$—$CF_2$—$CF_3$ | 6 | 29,797 |
| 6 | —H | 3 | —$CH_2$— | —$CF_2$—$CF_2$— | —$CF_2$—$CF_2$— | —$CF_2$—$CF_2$— | —$CF_2$—$CF_2$—$CF_3$ | 9 | 29,914 |
| 7 | —H | 3 | —$CH_2$— | —$CF_2$—$CF_2$— | —$CF_2$—$CF_2$— | —$CF_2$—$CF_2$— | —$CF_2$—$CF_2$—$CF_3$ | 9 | 31,974 |
| 8 | —H | 3 | —$CH_2$— | —$CF_2$—$CF_2$— | —$CF_2$—$CF_2$— | —$CF_2$—$CF_2$— | —$CF_2$—$CF_2$—$CF_3$ | 9 | 34,169 |
| 9 | —H | 3 | —$CH_2$— | —$CF_2$—$CF_2$— | —$CF_2$—$CF_2$— | —$CF_2$—$CF_2$— | —$CF_2$—$CF_2$—$CF_3$ | 9 | 16,900 |
| 10 | —H | 3 | —$CH_2$— | —$CF_2$—$CF_2$— | —$CF_2$—$CF_2$— | —$CF_2$—$CF_2$— | —$CF_2$—$CF_2$—$CF_3$ | 9 | 18,452 |
| 11 | —H | 3 | —$CH_2$— | —$CF_2$—$CF_2$— | —$CF_2$—$CF_2$— | —$CF_2$—$CF_2$— | —$CF_2$—$CF_2$—$CF_3$ | 9 | 79,852 |
| 12 | —H | 3 | —$CH_2$— | —$CF_2$—$CF_2$— | —$CF_2$—$CF_2$— | —$CF_2$—$CF_2$— | —$CF_2$—$CF_2$—$CF_3$ | 9 | 98,824 |
| 13 | —H | 3 | —$CH_2$— | —$CF_2$—$CF_2$— | —$CF_2$—$CF_2$— | —$CF_2$—$CF_2$— | —$CF_2$—$CF_2$—$CF_3$ | 9 | 15,890 |
| 14 | —H | 3 | —$CH_2$— | —$CF_2$—$CF_2$— | —$CF_2$—$CF_2$— | —$CF_2$—$CF_2$— | —$CF_2$—$CF_2$—$CF_3$ | 9 | 115,450 |
| 15 | —H | 3 | —$CH_2$— | —$CF_2$—$CF_2$— | —$CF_2$—$CF_2$— | —$CF_2$—$CF_2$— | —$CF_2$—$CF_2$—$CF_3$ | 9 | 29,001 |
| 16 | —H | 3 | —$CH_2$— | —$CF_2$—$CF_2$— | —$CF_2$—$CF_2$— | —$CF_2$—$CF_2$— | —$CF_2$—$CF_2$—$CF_3$ | 9 | 31,397 |
| 17 | —H | 3 | —$CH_2$— | —$CF_2$— | —$CF_2$— | —$CF_2$— | —$CF_2$—$CF_3$ | 5 | 28,557 |
| 18 | —H | 3 | —$CH_2$— | —$CF_2$—$CF_2$— | —$CF_2$—$CF_2$— | —$CF_2$—CF—<br>\|<br>$CF_3$ | —$CF_2$—$CF_2$—$CF_3$ | 10 | 34,755 |
| 19 | —H | 2 | —$CH_2$— | —$CF_2$—$CF_2$— | —$CF_2$—CF—<br>\|<br>$CF_3$ | | —$CF_2$—$CF_2$—$CF_2$—$CF_3$ | 9 | 33,118 |
| 20 | —H | 3 | —$CH_2$— | —$CF_2$— | —$CF_2$— | —$CF_2$— | —$CF_2$—$CF_2$—$CF_2$—<br>$CF_2$—$CF_2$—$CF_3$ | 9 | 33,515 |
| 21 | —H | 3 | —$CH_2$—$CH_2$—<br>$CH_2$— | —$CF_2$—$CF_2$— | —$CF_2$—$CF_2$— | —$CF_2$—$CF_2$— | —$CF_2$—$CF_2$—$CF_3$ | 9 | 34,209 |

<Production of Electrophotographic Photosensitive Member>

Example 1-1

(Support 1)

A product obtained by cutting a cylindrical aluminum cylinder (JIS-A3003, aluminum alloy, outer diameter: 30.6 mm, length: 370 mm, wall thickness: 1 mm) was used as a support (electroconductive support). The support was subjected to ultrasonic cleaning in a cleaning liquid obtained by incorporating a detergent (product name: CHEMICOL CT, manufactured by Tokiwa Chemical Industries Co., Ltd.) into pure water, and subsequently, the cleaning liquid was washed off. After that, the cleaned product was further subjected to ultrasonic cleaning in pure water to be subjected to degreasing treatment. The resultant was used as a support 1.

(Undercoat Layer 1)

100 Parts of zinc oxide particles (specific surface area: 19 $m^2/g$, powder resistance: $4.7\times10^6$ Ω·cm) were stirred and mixed with 500 parts of toluene. 0.8 Part of a silane coupling agent (compound name: N-2-(aminoethyl)-3-aminopropylmethyldimethoxysilane, product name: KBM-602, manufactured by Shin-Etsu Chemical Co., Ltd.) was added to the resultant mixture, followed by stirring for 6 hours. After that, toluene was evaporated under reduced pressure, and the residue was heated and dried at 130° C. for 6 hours to provide surface-treated zinc oxide particles A.

Subsequently, 15 parts of a butyral resin (product name: BM-1, manufactured by Sekisui Chemical Company, Limited) serving as a polyol and 15 parts of a blocked isocyanate (product name: DURANATE TPA-B80E, non-volatile content: 80 mass %, manufactured by Asahi Kasei Chemicals Corporation) were prepared. Those materials were dissolved in a mixed solvent containing 73.5 parts of methyl ethyl ketone and 73.5 parts of 1-butanol. 80.8 Parts of the surface-treated zinc oxide particles A and 0.81 part of 2,3,4-trihydroxybenzophenone (manufactured by Tokyo Chemical Industry Co., Ltd.) were added to the solution, and the materials were dispersed with a sand mill apparatus using glass beads each having a diameter of 0.8 mm under an atmosphere at 23° C.±3° C. for 3 hours.

Subsequently, the following materials were prepared.

| | |
|---|---|
| Silicone oil (product name: SH28PA, manufactured by Dow Corning Toray Co., Ltd. (formerly Dow Corning Toray Silicone Co., Ltd.)) | 0.01 part |
| Crosslinked polymethyl methacrylate (PMMA) particles (product name: TECHPOLYMER SSX-103, manufactured by Sekisui Kasei Co., Ltd., average primary particle diameter: 3 μm) | 5.6 parts |

Those materials were added to the solution after the above-mentioned dispersion treatment, and the mixture was stirred to prepare a coating liquid for an undercoat layer.

The resultant coating liquid for an undercoat layer was applied onto the above-mentioned support 1 by dip coating to form a coating film, and the coating film was dried for 30 minutes at 160° C. to form an undercoat layer 1 having a thickness of 18 μm.

(Charge Generating Layer 1)

The following materials were prepared.

| | |
|---|---|
| Hydroxygallium phthalocyanine crystal (charge generating substance) of a crystal form having strong peaks at Bragg angles 2θ ± 0.2° of 7.4° and 28.1° in CuKα characteristic X-ray diffraction | 4 parts |
| Compound represented by the following formula (E) | 0.04 part |

Those materials were added to a liquid obtained by dissolving 2 parts of polyvinyl butyral (product name: S-LEC BX-1, manufactured by Sekisui Chemical Company, Limited) in 100 parts of cyclohexanone. After that, the mixture was subjected to dispersion treatment with a sand mill using glass beads each having a diameter of 1 mm under an atmosphere at 23° C.±3° C. for 1 hour. After the dispersion treatment, 100 parts of ethyl acetate was added to the resultant to prepare a coating liquid for a charge generating layer.

The coating liquid for a charge generating layer was applied onto the undercoat layer 1 by dip coating, and the resultant coating film was dried for 10 minutes at 90° C. to form a charge generating layer 1 having a thickness of 0.13 μm.

(E)

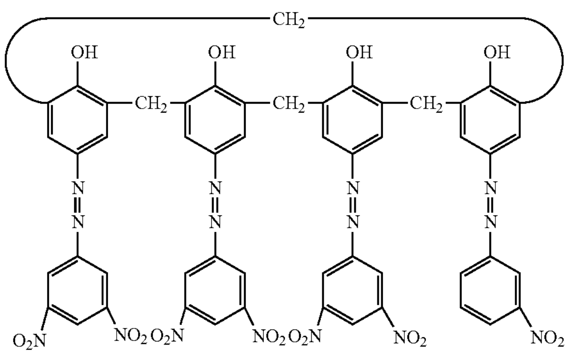

(Charge Transporting Layer 1)

The following materials were prepared.

| | |
|---|---|
| Compound represented by the following formula (F) | 60 parts |
| Compound represented by the following formula (G) | 30 parts |
| Compound represented by the following formula (H) | 10 parts |
| Bisphenol Z type polycarbonate resin (product name: IUPILON Z400, manufactured by Mitsubishi Engineering-Plastics Corporation) | 100 parts |
| Polycarbonate having a unit represented by the following formula (I) (viscosity average molecular weight Mv: 20,000) | 0.2 part |

Those materials were dissolved in a mixed solvent containing 272 parts of o-xylene, 256 parts of methyl benzoate, and 272 parts of dimethoxymethane to prepare a coating liquid for a charge transporting layer.

The coating liquid for a charge transporting layer was applied onto the above-mentioned charge generating layer 1 by dip coating to form a coating film, and the resultant coating film was dried for 50 minutes at 115° C. to form a charge transporting layer 1 having a thickness of 18 μm.

(G)

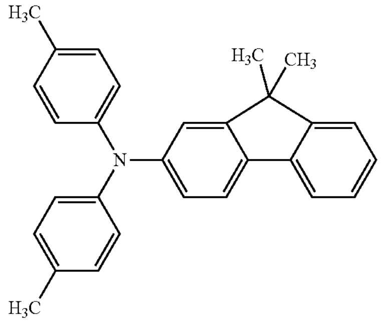

(H)

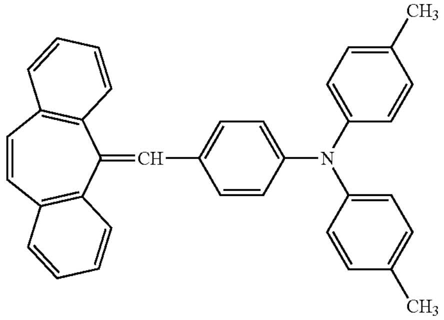

(I)

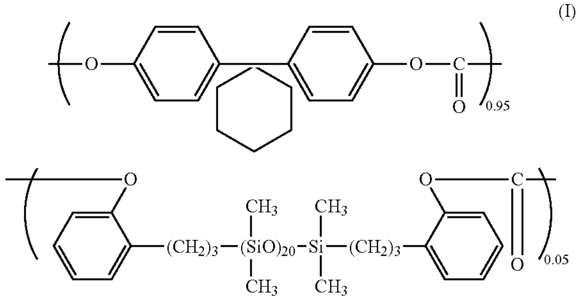

In the formula (I), 0.95 and 0.05 represent the molar ratios (copolymerization ratios) of the two units.

(Protection Layer)

2.20 Parts of the graft copolymer 1 was dissolved in a mixed solvent formed of 100 parts of 1,1,2,2-tetrafluoroethyl-2,2,2-trifluoroethyl ether (product name: AE-3000, manufactured by AGC Inc.) and 100 parts of 1-propanol to prepare a dispersant solution.

40 Parts of polytetrafluoroethylene resin particles (average primary particle diameter: 210 nm, average circularity: 0.85) were added to the resultant dispersant solution. Then, the mixture was passed through a high-pressure dispersing machine (product name: MICROFLUIDIZER M-110EH, manufactured by Microfluidics, USA) to provide a polytetrafluoroethylene resin particle dispersion liquid.

75.4 Parts of a hole transportable compound represented by the following formula (J), 21.9 parts of a compound represented by the following formula (K), and 100 parts of 1-propanol were added to the resultant polytetrafluoroethylene resin particle dispersion liquid. After that, the mixture was filtered with a polyflon filter (product name: PF-040, manufactured by Advantec Toyo Kaisha, Ltd.) to prepare a polytetrafluoroethylene resin particle dispersion liquid (coating liquid for a protection layer).

(J)

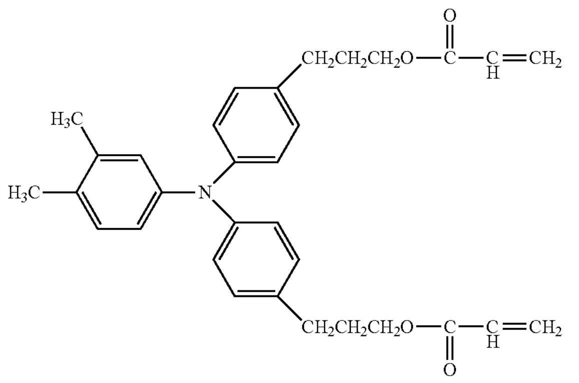

(K)

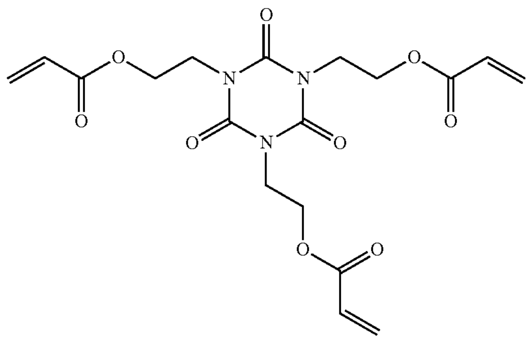

The coating liquid for a protection layer was applied onto the charge transporting layer 1 by dip coating to form a coating film, and the resultant coating film was dried for 5 minutes at 40° C. After the drying, under a nitrogen atmosphere, the coating film was irradiated with electron beams for 1.6 seconds under the conditions of an acceleration voltage of 70 kV and an absorbed dose of 15 kGy. After that, under the nitrogen atmosphere, the coating film was subjected to heating treatment for 15 seconds under such a condition that its temperature became 135° C. An oxygen concentration during a time period from the electron beam irradiation to the 15 seconds of heating treatment was 15 ppm. Next, in the air, the coating film was naturally cooled until its temperature became 25° C. After that, the coating film was subjected to heating treatment for 1 hour under such a condition that its temperature became 105° C. Thus, a surface layer (protection layer) having a thickness of 5.5 m was formed.

Thus, an electrophotographic photosensitive member including the support and the surface layer before its surface polishing was produced.

<Surface Processing of Electrophotographic Photosensitive Member>

(Polishing of Electrophotographic Photosensitive Member Before Surface Polishing)

The surface of the electrophotographic photosensitive member before the formation of a surface shape was polished. The polishing was performed with the polishing apparatus of FIG. 2 under the following conditions.

Feeding speed of polishing sheet; 400 mm/min

Number of revolutions of electrophotographic photosensitive member; 450 rpm

Indentation of electrophotographic photosensitive member into backup roller; 3.5 mm Feeding direction of polishing sheet and rotation direction of electrophotographic photosensitive member; identical with each other Backup roller; outer diameter: 100 mm, Asker C hardness: 25

A polishing sheet A to be mounted on the polishing apparatus was produced by mixing polishing abrasive grains used in GC3000 and GC2000 manufactured by Riken Corundum Co., Ltd.

GC3000 (polishing sheet surface roughness Ra: 0.83 μm)

GC2000 (polishing sheet surface roughness Ra: 1.45 μm)

Polishing sheet A (polishing sheet surface roughness Ra: 1.12 μm)

The time period for which the polishing was performed with the polishing sheet A was set to 20 seconds.

(Measurement of Polishing Depth L (μm))

The maximum height Rmax in accordance with JIS B0601 1982 was measured for the electrophotographic photosensitive member after the polishing with a surface roughness measuring instrument SURFCORDER SE3500 manufactured by Kosaka Laboratory Ltd. Measurement conditions were set as described below. The measurement was performed at 3 arbitrary sites in a 5-millimeter square range, and the average of the measured values was adopted as the polishing depth L (μm). The polishing depth L of the electrophotographic photosensitive member after the surface polishing was 0.75 μm. In addition, in Examples 1-2 to 1-25 to be described later, all the polishing depths L of electrophotographic photosensitive members subjected to surface processing were 0.75 μm.

(Measurement Conditions)

Detector: R 2 μm

Stylus: diamond stylus having a measuring force of 0.7 mN

Filter: 2CR

Cut-off value: 0.08 mm

Measurement length: 2.5 mm

Feeding speed: 0.1 mm/sec

Examples 1-2 to 1-12 and 1-21 to 1-26, and Comparative Examples 1-1 to 1-3

Electrophotographic photosensitive members were each produced in the same manner as in Example 1-1 except that in the formation of the protection layer, the graft copolymer 1 was changed to a graft copolymer shown in Table 5.

Examples 1-13, 1-14, 1-19, and 1-20

Electrophotographic photosensitive members were each produced in the same manner as in Example 1-1 except that in the formation of the protection layer, the usage amount of the graft copolymer 1 was changed to the number of parts by mass shown in Table 5.

Examples 1-15 to 1-18

Electrophotographic photosensitive members were each produced in the same manner as in Example 1-1 except that in the formation of the protection layer, the polytetrafluoroethylene resin particles to be used were changed to particles having an average primary particle diameter and an average circularity shown in Table 5.

Example 1-27

An electrophotographic photosensitive member was produced in the same manner as in Example 1-1 except that in the formation of the protection layer, a coating liquid for a protection layer was produced under the following conditions.

2.2 Parts of the graft copolymer 1 was dissolved in 80 parts of tetrahydrofuran serving as a solvent to prepare a dispersant solution.

31 Parts of polytetrafluoroethylene resin particles (average primary particle diameter: 210 nm, average circularity: 0.85) were added to the resultant dispersant solution. Then, the mixture was passed through a high-pressure dispersing machine (product name: MICROFLUIDIZER M-110EH, manufactured by Microfluidics, USA) to provide a polytetrafluoroethylene resin particle dispersion liquid.

Subsequently, the following materials were prepared.

| | |
|---|---|
| Charge transportable compound represented by the formula C-26 | 161 parts |
| Guanamine compound represented by the following formula (L) | 5 parts |
| 3,5-Di-t-butyl-4-hydroxytoluene (BHT) | 2.6 parts |
| Dodecylbenzenesulfonic acid | 0.4 part |
| Cyclopentanone | 130 parts |
| Cyclopentanol | 90 parts |

Those materials were added to the polytetrafluoroethylene resin particle dispersion liquid obtained in the foregoing. After that, the mixture was filtered with a polyflon filter (product name: PF-040, manufactured by Advantec Toyo Kaisha, Ltd.) to provide a coating liquid for a protection layer according to Example 1-27.

(L)

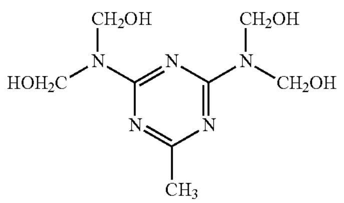

Example 1-28

An electrophotographic photosensitive member was produced in the same manner as in Example 1-27 except that in the formation of the surface layer, the guanamine compound represented by the formula (L) was changed to a melamine compound represented by the following formula (M).

(K)

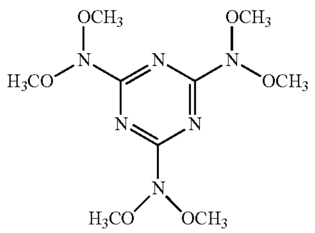

TABLE 5

| | Graft copolymer No. | Number of parts by mass of graft copolymer | Average primary particle diameter of polytetrafluoroethylene particles [nm] | Average circularity of polytetrafluoroethylene particles |
|---|---|---|---|---|
| Example 1-1 | 1 | 2.20 | 210 | 0.85 |
| Example 1-2 | 2 | 2.20 | 210 | 0.85 |
| Example 1-3 | 3 | 2.20 | 210 | 0.85 |
| Example 1-4 | 4 | 2.20 | 210 | 0.85 |
| Example 1-5 | 5 | 2.20 | 210 | 0.85 |
| Example 1-6 | 6 | 2.20 | 210 | 0.85 |
| Example 1-7 | 7 | 2.20 | 210 | 0.85 |
| Example 1-8 | 8 | 2.20 | 210 | 0.85 |
| Example 1-9 | 9 | 2.20 | 210 | 0.85 |
| Example 1-10 | 10 | 2.20 | 210 | 0.85 |
| Example 1-11 | 11 | 2.20 | 210 | 0.85 |
| Example 1-12 | 12 | 2.20 | 210 | 0.85 |
| Example 1-13 | 1 | 1.60 | 210 | 0.85 |
| Example 1-14 | 1 | 3.20 | 210 | 0.85 |
| Example 1-15 | 1 | 2.20 | 189 | 0.87 |
| Example 1-16 | 1 | 2.20 | 247 | 0.80 |
| Example 1-17 | 1 | 2.20 | 142 | 0.85 |
| Example 1-18 | 1 | 2.20 | 352 | 0.79 |
| Example 1-19 | 1 | 0.40 | 210 | 0.85 |
| Example 1-20 | 1 | 4.40 | 210 | 0.85 |
| Example 1-21 | 13 | 2.20 | 210 | 0.85 |
| Example 1-22 | 14 | 2.20 | 210 | 0.85 |
| Example 1-23 | 15 | 2.20 | 210 | 0.85 |
| Example 1-24 | 16 | 2.20 | 210 | 0.85 |
| Example 1-25 | 17 | 2.20 | 210 | 0.85 |
| Example 1-26 | 18 | 2.20 | 210 | 0.85 |
| Example 1-27 | 1 | 2.20 | 210 | 0.85 |
| Example 1-28 | 1 | 2.20 | 210 | 0.85 |
| Comparative Example 1-1 | 19 | 2.20 | 210 | 0.85 |
| Comparative Example 1-2 | 20 | 2.20 | 210 | 0.85 |
| Comparative Example 1-3 | 21 | 2.20 | 210 | 0.85 |

<Evaluation of Electrophotographic Photosensitive Member>

The electrophotographic photosensitive members obtained in Examples 1-1 to 1-28 and Comparative Examples 1-1 to 1-3 were evaluated as described below.

[Evaluation Apparatus 1-1]

An evaluation was performed by mounting each of the electrophotographic photosensitive members on a copying machine imagePRESS C800 (product name) manufactured by Canon Inc.

Specifically, the above-mentioned evaluation apparatus was placed under an environment having a temperature of 23° C. and a relative humidity of 50% RH, and each of the produced electrophotographic photosensitive members was mounted on its process cartridge for a magenta color. The resultant was mounted on the station of the process cartridge for a magenta color, and the evaluation was performed.

[Evaluation Apparatus 1-2]

An evaluation was performed by mounting each of the electrophotographic photosensitive members on a reconstructed machine of a copying machine imagePRESS C800 (product name) manufactured by Canon Inc. The charging unit of the reconstructed machine is a charging unit of such a system as to apply, to a roller type contact charging member (charging roller), a voltage obtained by superimposing an AC voltage on a DC voltage, and the exposing unit thereof is an exposing unit of a laser image exposure system (wavelength: 680 nm).

Specifically, the above-mentioned evaluation apparatus was placed under an environment having a temperature of 23° C. and a relative humidity of 50% RH, and each of the produced electrophotographic photosensitive members was mounted on its process cartridge for a magenta color. The resultant was mounted on the station of the process cartridge for a magenta color, and the evaluation was performed.

With regard to charging conditions, a charging potential and the exposure amount of the exposing unit were adjusted so that a charging potential of −800 V and an exposure potential of −300 V were obtained.

The surface potential of each of the electrophotographic photosensitive members was measured by removing a cartridge for development from the above-mentioned evaluation apparatus and inserting a potential measuring device into the resultant space. The potential measuring device is formed by arranging a potential measuring probe (product name: model 6000B-8, manufactured by Trek Japan) at the development position of the cartridge for development. In addition, the position of the potential measuring probe with respect to the electrophotographic photosensitive member was set as follows: the probe was placed at a center in the generating line direction of the electrophotographic photosensitive member while being distant from the surface of the electrophotographic photosensitive member with a gap of 3 mm. Further, a potential at the central portion of the electrophotographic photosensitive member was measured with a surface potentiometer (product name: model 344, manufactured by Trek Japan).

(Initial Image Evaluation)

An image evaluation was performed by using the above-mentioned evaluation apparatus 1-1. An entirely solid white image was output on A4 size gloss paper, and the number of image defects due to a dispersion failure in the area of the output image corresponding to one round of each of the electrophotographic photosensitive members, that is, black spots was visually evaluated. The number of black spots each having a diameter of 0.3 mm or more was evaluated. The area corresponding to one round of the electrophotographic photosensitive member is a rectangular region measuring 297 mm, which is the length of the long side of the A4 paper, in a longitudinal direction and 96.1 mm, which is one round of the electrophotographic photosensitive member, in a lateral direction. In the present disclosure, the number of the black spots is desirably as small as possible, and as the number reduces, the effect of the present disclosure is obtained to a larger extent.

The results of the evaluations performed as described above are shown in Table 6.

(Evaluation of Potential Fluctuation at Time of Repeated Use)

The evaluation of a fluctuation in potential of each of the electrophotographic photosensitive members at the time of its repeated use was performed by using the above-mentioned evaluation apparatus 1-2. The cartridge of the evaluation apparatus including the electrophotographic photosensitive member was mounted on the evaluation apparatus, and the photosensitive member was repeatedly used by passing 10,000 sheets of paper. A monochromatic letter image having a print percentage of 1% was repeatedly formed on 10,000 sheets of A4 size plain paper in the station of the cartridge having arranged thereon the electrophotographic photosensitive member.

The initial light portion potential of the photosensitive member and the light portion potential thereof after the repeated image formation on the 10,000 sheets at this time are compared to each other, and a difference between these potentials is defined as a potential fluctuation value ($\Delta V1$). After the completion of the passing of the 10,000 sheets, the apparatus was left to stand for 5 minutes, and its cartridge for development was replaced with the potential measuring device, followed by the measurement of the light portion potential ($V1b$) of the photosensitive member after the repeated use. The difference between the light portion potential after the repeated use and the initial light portion potential ($V1a$) was defined as a light portion potential fluctuation amount ($\Delta V1=|V1b|-|V1a|$). In the evaluation with the evaluation apparatus 1-2, the light portion potential fluctuation amount of the photosensitive member at the time of its repeated use in image formation on 100,000 sheets, 300,000 sheets, or 500,000 sheets was further measured.

In the present disclosure, the light portion potential fluctuation amount is desirably as small as possible, and as the amount becomes smaller, the effect of the present disclosure is obtained to a larger extent.

The results of the evaluations performed as described above are shown in Table 6.

TABLE 6

| | Evaluation result | | | | |
|---|---|---|---|---|---|
| Example No. | Number of black spots of initial image [spot(s)] | ΔVl after passing of 10,000 sheets [V] | ΔVl after passing of 100,000 sheets [V] | ΔVl after passing of 300,000 sheets [V] | ΔVl after passing of 500,000 sheets [V] |
| Example 1-1 | 0 | 6 | 9 | 11 | 12 |
| Example 1-2 | 0 | 6 | 9 | 11 | 12 |
| Example 1-3 | 4 | 7 | 9 | 10 | 12 |
| Example 1-4 | 0 | 15 | 19 | 24 | 29 |
| Example 1-5 | 0 | 7 | 9 | 10 | 11 |
| Example 1-6 | 1 | 9 | 11 | 13 | 15 |
| Example 1-7 | 0 | 8 | 10 | 12 | 15 |
| Example 1-8 | 0 | 8 | 10 | 13 | 15 |
| Example 1-9 | 2 | 8 | 10 | 12 | 13 |
| Example 1-10 | 0 | 8 | 10 | 12 | 13 |
| Example 1-11 | 0 | 9 | 10 | 12 | 13 |
| Example 1-12 | 0 | 11 | 12 | 15 | 16 |
| Example 1-13 | 0 | 8 | 10 | 12 | 13 |
| Example 1-14 | 0 | 10 | 12 | 13 | 15 |
| Example 1-15 | 0 | 10 | 12 | 13 | 14 |
| Example 1-16 | 0 | 10 | 12 | 13 | 14 |
| Example 1-17 | 1 | 10 | 12 | 13 | 15 |
| Example 1-18 | 0 | 12 | 14 | 15 | 17 |
| Example 1-19 | 3 | 10 | 12 | 13 | 15 |
| Example 1-20 | 3 | 14 | 18 | 24 | 28 |
| Example 1-21 | 2 | 14 | 18 | 23 | 28 |
| Example 1-22 | 1 | 17 | 22 | 26 | 32 |
| Example 1-23 | 3 | 17 | 23 | 27 | 33 |
| Example 1-24 | 3 | 18 | 19 | 28 | 34 |
| Example 1-25 | 5 | 18 | 19 | 29 | 35 |
| Example 1-26 | 3 | 20 | 22 | 33 | 38 |
| Example 1-27 | 0 | 6 | 10 | 11 | 13 |
| Example 1-28 | 0 | 7 | 9 | 11 | 14 |
| Comparative Example 1-1 | 2 | 32 | 39 | 43 | 46 |
| Comparative Example 1-2 | 2 | 31 | 39 | 42 | 43 |
| Comparative Example 1-3 | 8 | 11 | 13 | 14 | 16 |

Example 2-1

(Support 2)

A product obtained by cutting a cylindrical aluminum cylinder (JIS-A3003, aluminum alloy, outer diameter: 30 mm, length: 357.5 mm, wall thickness: 0.7 mm) was used as a support (electroconductive support). The support was subjected to ultrasonic cleaning in a cleaning liquid obtained by incorporating a detergent (product name: CHEMICOL CT, manufactured by Tokiwa Chemical Industries Co., Ltd.) into pure water, and subsequently, the cleaning liquid was washed off. After that, the cleaned product was further subjected to ultrasonic cleaning in pure water to be subjected to degreasing treatment. The resultant was used as a support 2.

(Undercoat Layer 2)

60 Parts of zinc oxide particles (average particle diameter: 70 nm, specific surface area: 15 $m^2/g$) were stirred and mixed with 500 parts of tetrahydrofuran. 0.75 Part of a silane coupling agent (compound name: N-2-(aminoethyl)-3-aminopropyltrimethoxysilane, product name: KBM-603, manufactured by Shin-Etsu Chemical Co., Ltd.) was added to the resultant mixture, followed by stirring for 2 hours. After that, tetrahydrofuran was evaporated under reduced pressure, and the residue was heated and dried at 120° C. for 3 hours to provide surface-treated zinc oxide particles.

Subsequently, 25 parts of a butyral resin (product name: BM-1, manufactured by Sekisui Chemical Company, Limited) serving as a polyol and 22.5 parts of a blocked isocyanate (product name: SUMIDUR BL-3173, manufactured by Sumitomo Bayer Urethane Co., Ltd.) were dissolved in 142 parts of methyl ethyl ketone. 100 Parts of the surface-treated zinc oxide particles and 1 part of anthraquinone were added to the solution, and the materials were dispersed with a sand mill using glass beads each having a diameter of 1 mm for 5 hours.

After the dispersion treatment, 0.008 part of dioctyltin dilaurate and 6.5 parts of silicone resin particles (TOSPEARL 145, manufactured by GE Toshiba Silicone Co., Ltd.) were added to the resultant, and the mixture was stirred to prepare a coating liquid for an undercoat layer.

The resultant coating liquid for an undercoat layer was applied onto the above-mentioned support 2 by dip coating to form a coating film, and the coating film was dried at 190° C. for 24 minutes to form an undercoat layer 2 having a thickness of 15 μm.

(Charge Generating Layer 2)

Next, the following materials were prepared.

| | |
|---|---|
| Chlorogallium phthalocyanine crystal having strong diffraction peaks at Bragg angles (2θ ± 0.2°) of at least 7.4°, 16.6°, 25.5°, and 28.3° for a CuKα characteristic X-ray | 15 parts |
| Vinyl chloride-vinyl acetate copolymer resin (VMCH, manufactured by Union Carbide Japan K.K.) | 10 parts |
| n-Butyl alcohol | 300 parts |

Those materials were mixed, and the mixture was subjected to dispersion treatment with a sand mill using glass beads each having a diameter of 1 mm for 4 hours to prepare a coating liquid for a charge generating layer.

The coating liquid for a charge generating layer was applied onto the undercoat layer 2 by dip coating, and the resultant coating film was dried at 150° C. for 5 minutes to form a charge generating layer 2 having a thickness of 0.18 μm.

(Charge Transporting Layer 2)

Next, 10 parts of polytetrafluoroethylene resin particles (average primary particle diameter: 210 nm, average circularity: 0.85), 0.50 part of the above-mentioned graft copolymer 1, and 24 parts of tetrahydrofuran were stirred and mixed for 48 hours while the temperature of the mixed liquid was kept at 20° C. Thus, a prepared liquid A was obtained.

Next, the following materials were prepared.

| | |
|---|---|
| N,N'-Bis(3-methylphenyl)-N,N'-diphenylbenzidine | 53.2 parts |
| Bisphenol Z type polycarbonate resin (viscosity average molecular weight: 40,000) | 14.1 parts |
| 2,6-Di-t-butyl-4-methylphenol serving as an antioxidant | 0.26 part |

Those materials were mixed, and 250 parts of tetrahydrofuran was mixed and dissolved in the mixture to provide a prepared liquid B.

The prepared liquid A was added to the prepared liquid B, and the liquids were stirred and mixed. After that, the mixture was passed through a high-pressure dispersing machine (product name: MICROFLUIDIZER M-110EH, manufactured by Microfluidics, USA) to provide a dispersion liquid.

After that, a fluorine-modified silicone oil (product name: FL-100, manufactured by Shin-Etsu Silicone) was added to the dispersion liquid so that its concentration became 5 ppm. The mixture was filtered with a polyflon filter (product name: PF-040, manufactured by Advantec Toyo Kaisha, Ltd.) to prepare a coating liquid for a charge transporting layer.

The coating liquid for a charge transporting layer was applied onto the charge generating layer 2 by dip coating to form a coating film, and the resultant coating film was dried at 150° C. for 25 minutes to form a charge transporting layer 2 having a thickness of 30 μm.

Thus, an electrophotographic photosensitive member was produced.

Examples 2-2 to 2-12 and 2-21 to 2-26, and Comparative Examples 2-1 to 2-3

Electrophotographic photosensitive members were each produced in the same manner as in Example 2-1 except that in the formation of the protection layer, the graft copolymer 1 was changed to a graft copolymer shown in Table 7.

Examples 2-13, 2-14, 2-19, and 2-20

Electrophotographic photosensitive members were each produced in the same manner as in Example 2-1 except that in the formation of the protection layer, the usage amount of the graft copolymer 1 was changed to the number of parts by mass shown in Table 7.

Examples 2-15 to 2-18

Electrophotographic photosensitive members were each produced in the same manner as in Example 2-1 except that in the formation of the protection layer, the polytetrafluoroethylene resin particles to be used were changed to particles having an average primary particle diameter and an average circularity shown in Table 7.

TABLE 7

| | Graft copolymer No. | Number of parts by mass of graft copolymer | Average primary particle diameter of polytetrafluoroethylene resin particles [nm] | Average circularity of polytetrafluoroethylene resin particles |
|---|---|---|---|---|
| Example 2-1 | 1 | 0.50 | 210 | 0.85 |
| Example 2-2 | 2 | 0.50 | 210 | 0.85 |
| Example 2-3 | 3 | 0.50 | 210 | 0.85 |
| Example 2-4 | 4 | 0.50 | 210 | 0.85 |
| Example 2-5 | 5 | 0.50 | 210 | 0.85 |
| Example 2-6 | 6 | 0.50 | 210 | 0.85 |
| Example 2-7 | 7 | 0.50 | 210 | 0.85 |
| Example 2-8 | 8 | 0.50 | 210 | 0.85 |
| Example 2-9 | 9 | 0.50 | 210 | 0.85 |
| Example 2-10 | 10 | 0.50 | 210 | 0.85 |
| Example 2-11 | 11 | 0.50 | 210 | 0.85 |
| Example 2-12 | 12 | 0.50 | 210 | 0.85 |
| Example 2-13 | 1 | 0.40 | 210 | 0.85 |
| Example 2-14 | 1 | 0.80 | 210 | 0.85 |
| Example 2-15 | 1 | 0.50 | 189 | 0.87 |
| Example 2-16 | 1 | 0.50 | 247 | 0.80 |
| Example 2-17 | 1 | 0.50 | 142 | 0.85 |
| Example 2-18 | 1 | 0.50 | 352 | 0.79 |
| Example 2-19 | 1 | 0.10 | 210 | 0.85 |
| Example 2-20 | 1 | 1.10 | 210 | 0.85 |
| Example 2-21 | 13 | 0.50 | 210 | 0.85 |
| Example 2-22 | 14 | 0.50 | 210 | 0.85 |
| Example 2-23 | 15 | 0.50 | 210 | 0.85 |
| Example 2-24 | 16 | 0.50 | 210 | 0.85 |
| Example 2-25 | 17 | 0.50 | 210 | 0.85 |
| Example 2-26 | 18 | 0.50 | 210 | 0.85 |
| Comparative Example 2-1 | 19 | 0.50 | 210 | 0.85 |
| Comparative Example 2-2 | 20 | 0.50 | 210 | 0.85 |
| Comparative Example 2-3 | 21 | 0.50 | 210 | 0.85 |

<Evaluation of Electrophotographic Photosensitive Member>

The electrophotographic photosensitive members obtained in Examples 2-1 to 2-26 and Comparative Examples 2-1 to 2-3 were evaluated as described below.

[Evaluation Apparatus 2-1]

An evaluation was performed by mounting each of the electrophotographic photosensitive members on a copying machine imageRUNNER iR-ADV C5051 manufactured by Canon Inc.

Specifically, the above-mentioned evaluation apparatus was placed under an environment having a temperature of 23° C. and a relative humidity of 50% RH, and each of the produced electrophotographic photosensitive members was mounted on its process cartridge for a cyan color. The resultant was mounted on the station of the process cartridge for a cyan color, and the evaluation was performed.

[Evaluation Apparatus 2-2]

An evaluation was performed by mounting each of the electrophotographic photosensitive members on a reconstructed machine of the copying machine imageRUNNER iR-ADV C5051 manufactured by Canon Inc. The charging unit of the reconstructed machine is a charging unit of such a system as to apply a voltage obtained by superimposing an AC voltage on a DC voltage to a roller type contact charging member (charging roller), and the exposing unit thereof is an exposing unit of a laser image exposure system (wavelength: 780 nm).

Specifically, the above-mentioned evaluation apparatus was placed under an environment having a temperature of 23° C. and a relative humidity of 50% RH, and each of the produced electrophotographic photosensitive members was mounted on its process cartridge for a cyan color. The resultant was mounted on the station of the process cartridge for a cyan color, and the evaluation was performed.

With regard to charging conditions, a charging potential and the exposure amount of the exposing unit were adjusted so that a charging potential of −700 V and an exposure potential of −200 V were obtained.

The surface potential of each of the electrophotographic photosensitive members was measured by removing a cartridge for development from the above-mentioned evaluation apparatus and inserting a potential measuring device into the resultant space. The potential measuring device is formed by arranging a potential measuring probe (product name: model 6000B-8, manufactured by Trek Japan) at the development position of the cartridge for development. The position of the potential measuring probe with respect to the electrophotographic photosensitive member was set as follows: the probe was placed at a center in the generating line direction of the electrophotographic photosensitive member while being distant from the surface of the electrophotographic photosensitive member with a gap of 3 mm. Further, a potential at the central portion of the electrophotographic photosensitive member was measured with a surface potentiometer (product name: model 344, manufactured by Trek Japan).

(Initial Image Evaluation)

Image evaluations were performed by using the above-mentioned evaluation apparatus 2-1. An entirely solid white image was output on A4 size gloss paper, and the number of image defects due to a dispersion failure in the area of the output image corresponding to one round of each of the electrophotographic photosensitive members, that is, black spots was visually evaluated. The number of black spots each having a diameter of 0.3 mm or more was evaluated.

The area corresponding to one round of the electrophotographic photosensitive member is a rectangular region measuring 297 mm, which is the length of the long side of the A4 paper, in a longitudinal direction and 94.2 mm, which is one round of the electrophotographic photosensitive member, in a lateral direction. In the present disclosure, the number of the black spots is desirably as small as possible, and as the number reduces, the effect of the present disclosure is obtained to a larger extent.

The results of the evaluations performed as described above are shown in Table 8.

(Evaluation of Potential Fluctuation at Time of Repeated Use)

The evaluation of a fluctuation in potential of each of the electrophotographic photosensitive members at the time of its repeated use was performed by using the above-mentioned evaluation apparatus 2-2. The cartridge of the evaluation apparatus including the electrophotographic photosensitive member was mounted on the evaluation apparatus, and the photosensitive member was repeatedly used by passing 50,000 sheets of paper. A monochromatic letter image having a print percentage of 1% was repeatedly formed on 50,000 sheets of A4 size plain paper in the station of the cartridge having arranged thereon the electrophotographic photosensitive member. The initial light portion potential of the photosensitive member and the light portion potential thereof after the repeated image formation on the 50,000 sheets at this time are compared to each other, and a difference between these potentials is defined as a potential fluctuation value ($\Delta V1$). The difference between the light portion potential after the repeated use and the initial light portion potential ($V1a$) was defined as a light portion potential fluctuation amount ($\Delta V1=|V1b|-|V1a|$). In the evaluation with the evaluation apparatus 2-2, the light portion potential fluctuation amount of the photosensitive member at the time of its repeated use in image formation on 500,000 sheets was further measured.

In the present disclosure, the light portion potential fluctuation amount is desirably as small as possible, and as the amount becomes smaller, the effect of the present disclosure is obtained to a larger extent.

The results of the evaluations performed as described above are shown in Table 8.

TABLE 8

| Example No. | Evaluation result<br>Number of black spots of initial image [spot(s)] | ΔVl after passing of 50,000 sheets [V] | ΔVl after passing of 500,000 sheets [V] |
|---|---|---|---|
| Example 2-1 | 0 | 8 | 11 |
| Example 2-2 | 0 | 9 | 11 |
| Example 2-3 | 4 | 9 | 11 |
| Example 2-4 | 0 | 16 | 21 |
| Example 2-5 | 0 | 10 | 12 |
| Example 2-6 | 2 | 11 | 13 |
| Example 2-7 | 0 | 10 | 12 |
| Example 2-8 | 0 | 10 | 12 |
| Example 2-9 | 2 | 10 | 12 |
| Example 2-10 | 0 | 10 | 12 |
| Example 2-11 | 0 | 11 | 12 |
| Example 2-12 | 0 | 13 | 14 |
| Example 2-13 | 0 | 10 | 12 |
| Example 2-14 | 0 | 12 | 14 |
| Example 2-15 | 0 | 12 | 14 |
| Example 2-16 | 0 | 12 | 14 |
| Example 2-17 | 1 | 13 | 15 |
| Example 2-18 | 0 | 15 | 17 |
| Example 2-19 | 3 | 14 | 16 |
| Example 2-20 | 4 | 16 | 20 |
| Example 2-21 | 2 | 18 | 22 |
| Example 2-22 | 1 | 21 | 25 |
| Example 2-23 | 3 | 23 | 26 |
| Example 2-24 | 4 | 24 | 27 |
| Example 2-25 | 5 | 24 | 28 |
| Example 2-26 | 3 | 26 | 32 |
| Comparative Example 2-1 | 2 | 35 | 43 |
| Comparative Example 2-2 | 2 | 34 | 41 |
| Comparative Example 2-3 | 7 | 12 | 14 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-020583, filed Feb. 14, 2022, which is hereby incorporated by reference herein in its entirety.

What is claimed is:

1. An electrophotographic photosensitive member, comprising:

a surface layer, the surface layer comprising a fluorine atom-containing resin particle, a binder material, and a polymer A having a structural unit represented by formula (1)

(1)

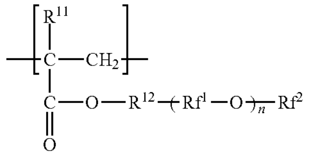

where $R^{11}$ represents a hydrogen atom or a methyl group, $R^{12}$ represents a single bond, a methylene group, or an ethylene group, "n" represents 3, $Rf^1$ represents a perfluoromethylene group, and $Rf^2$ represents a perfluoroalkyl group having 2 or 3 carbon atoms.

2. The electrophotographic photosensitive member according to claim 1, wherein a total number of carbon atoms of $Rf^1$s and $Rf^2$ 6.

3. The electrophotographic photosensitive member according to claim 1, wherein polymer A has a weight-average molecular weight of 16,000 to 100,000.

4. The electrophotographic photosensitive member according to claim 1, wherein a content of polymer A in the surface layer is 2 to 10 mass % with respect to a content of the fluorine atom-containing resin particle in the surface layer.

5. The electrophotographic photosensitive member according to claim 1, wherein the polymer A comprises a structural unit represented by formula (2)

(2)

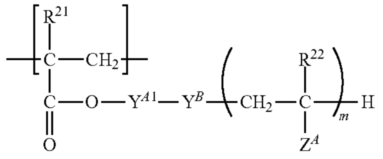

where $Y^{A1}$ represents an unsubstituted alkylene group, $Y^B$ represents an unsubstituted alkylene group, an alkylene group substituted with a halogen atom, an alkylene group substituted with a hydroxy group, an ester bond (—COO—), an amide bond (—NHCO—), or a urethane bond (—NHCOO—), or a divalent linking group that may be derived by combining one or more kinds selected from these groups and bonds, and —O— or —S—, or a single bond, $R^{21}$ and $R^{22}$ independently represent a hydrogen atom or a methyl group, "m" represents an integer of from 25 to 150, and $Z^A$ represents a cyano group, a phenyl group or a structure represented by formula (2A)

(2A)

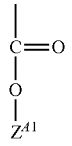

where $Z^{A1}$ represents an alkyl group having 1 to 4 carbon atoms.

6. The electrophotographic photosensitive member according to claim 5, wherein polymer A has only the structural unit represented by formula (1) and the structural unit represented by formula (2) as structural units.

7. The electrophotographic photosensitive member according to claim 1, wherein the fluorine atom-containing resin particle is a polytetrafluoroethylene resin particle.

8. The electrophotographic photosensitive member according to claim 1, wherein an arithmetic average of long diameters of primary particles of the fluorine atom-containing resin particles is 150 to 300 nm.

9. The electrophotographic photosensitive member according to claim 1, wherein a content of the fluorine atom-containing resin particle in the surface layer is 5 to 40 mass % with respect to a total mass of the surface layer.

10. The electrophotographic photosensitive member according to claim 1, wherein the binder material contains a cured product of a hole transportable compound having a polymerizable functional group.

11. The electrophotographic photosensitive member according to claim 10, wherein the hole transportable compound having a polymerizable functional group is at least one compound selected from a compound represented by formulae (CT-1) and (CT-2)

(CT-1)

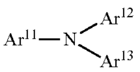

(CT-2)

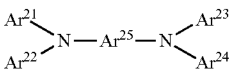

where $Ar^{11}$ to $Ar^{13}$ independently represent an aryl group that may have a substituent, and the substituent that the aryl group may have is an alkyl group having 1 to 6 carbon atoms, or a monovalent functional group represented by any one of formulae (P-1) to (P-3), provided that the compound represented by formula (CT-1) has at least one aryl group having, as a substituent, a monovalent functional group represented by one of formulae (P-1) to (P-3)

$Ar^{21}$ to $Ar^{24}$ independently represent an aryl group that may have a substituent, and the substituent that the aryl group may have is an alkyl group having 1 to 6 carbon atoms, or a monovalent functional group represented by any one of formulae (P-1) to (P-3), and $Ar^{25}$ represents an arylene group that may have a substituent, and the substituent that the arylene group may have is an alkyl group having 1 to 6 carbon atoms, or a monovalent functional group represented by any one of formulae (P-1) to (P-3), provided that the compound represented by formula (CT-2) has at least one group selected from an aryl group having, as a substituent, a monovalent functional group represented by any one of formulae (P-1) to (P-3), and an arylene group having, as a substituent, a monovalent functional group represented by any one of formulae (P-1) to (P-3)

(P-1)

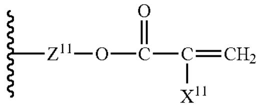

(P-2)

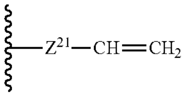

(P-3)

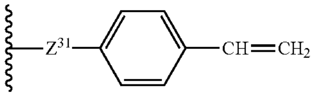

where $Z^{11}$ represents a single bond or an alkylene group having 1 to 6 carbon atoms, $X^{11}$ represents a hydrogen atom or a methyl group, $Z^{21}$ represents a single bond, or an alkylene group having 1 to 6 carbon atoms, and $Z^{31}$ represents a single bond or an alkylene group having 1 to 6 carbon atoms.

12. The electrophotographic photosensitive member according to claim 10, wherein a content of the fluorine atom-containing resin particle in the surface layer is 5 to 40 mass % with respect to a total mass of the surface layer.

13. The electrophotographic photosensitive member according to claim 1, wherein the binder material contains a cured product of: a charge transportable compound; and at least one kind of triazine compound selected from the group consisting of a guanamine compound and a melamine compound.

14. The electrophotographic photosensitive member according to claim 13, wherein the charge transportable compound has at least one polymerizable functional group selected from the group consisting of a methylol group and a methoxy group.

15. The electrophotographic photosensitive member according to claim 13, wherein a content of the fluorine atom-containing resin particle in the surface layer is 5 to 15 mass % with respect to a total mass of the surface layer.

16. The electrophotographic photosensitive member according to claim 1, wherein the binder material contains a thermoplastic polycarbonate or polyarylate resin, and the surface layer further contains a charge transporting substance.

17. The electrophotographic photosensitive member according to claim 16, wherein the charge transporting substance is at least one compound represented by formulae (4) or (5)

(4)

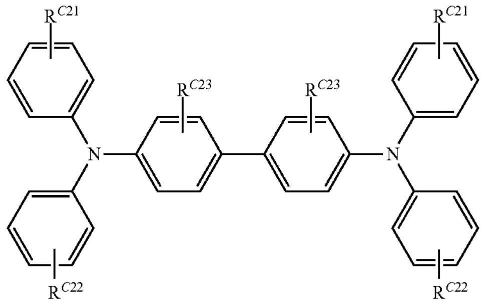

(5)

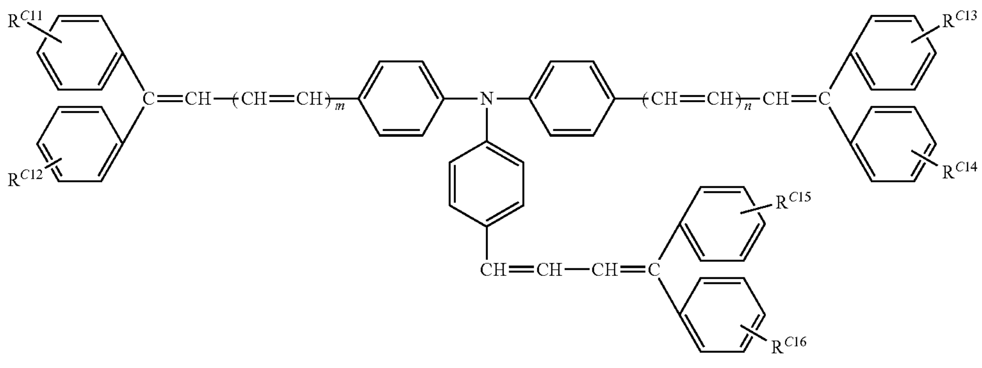

where (4), $R^{C11}$, $R^{C12}$, $R^{C13}$, $R^{C14}$, $R^{C15}$ and $R^{C16}$ independently represent a hydrogen atom, a halogen atom, an alkyl group having 1 to 20 carbon atoms, an alkoxy group having 1 to 20 carbon atoms or an aryl group having 6 to 30 carbon atoms, or two adjacent substituents are bonded to each other to form a hydrocarbon ring structure, and "m" and "n" independently represent 0, 1 or 2, and $R^{C21}$, $R^{C22}$ and $R^{C23}$ independently represent a hydrogen atom, a halogen atom, an alkyl group having 1 to 10 carbon atoms, an alkoxy group having 1 to 10 carbon atoms or an aryl group having 6 to 10 carbon atoms, and two $R^{C21}$s, two $R^{C22}$s, or two $R^{C23}$s may be identical to or different from each other.

18. The electrophotographic photosensitive member according to claim 16, wherein a content of the fluorine atom-containing resin particle in the surface layer is 5 to 15 mass % with respect to a total mass of the surface layer.

19. A process cartridge, comprising:

an electrophotographic photosensitive member; and at least one unit selected from the group consisting of a charging unit, a developing unit and a cleaning unit;

the process cartridge integrally supporting the electrophotographic photosensitive member and the at least one unit, and being detachably attachable to a main body of an electrophotographic apparatus;

the electrophotographic photosensitive member comprising a surface layer, the surface layer comprising a fluorine atom-containing resin particle, a binder material, and a polymer A having a structural unit represented by formula (1)

(1)

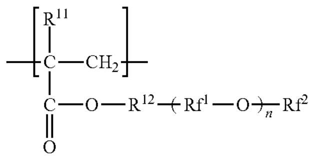

where $R^{11}$ represents a hydrogen atom or a methyl group, $R^{12}$ represents a single bond, a methylene group, or an ethylene group, "n" represents 3, $Rf^1$ represents a perfluoromethylene group, and $Rf^2$ represents a perfluoroalkyl group having 2 or 3 carbon atoms.

20. An electrophotographic apparatus, comprising:

an electrophotographic photosensitive member;

a charging unit;

an exposing unit;

a developing unit; and a transfer unit;

the electrophotographic photosensitive member comprising a surface layer, the surface layer comprising a fluorine atom-containing resin particle, a binder material, and a polymer A having a structural unit represented by formula (1)

(1)

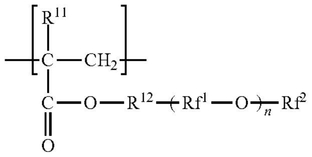

where $R^{11}$ represents a hydrogen atom or a methyl group, $R^{12}$ represents a single bond, a methylene group, or an ethylene group, "n" represents 3, $Rf^1$ represents a perfluoromethylene group, and $Rf^2$ represents a perfluoroalkyl group having 2 or 3 carbon atoms.

21. A method of producing an electrophotographic photosensitive member including a surface layer, the method comprising:

preparing a coating liquid for a surface layer containing (i) a polymer A having a structural unit represented by the following formula (1), (ii) a fluorine atom-containing resin particle, and (iii) at least one member selected from the group consisting of a binder material and a raw material for the binder material;

forming the surface layer by forming a coating film of the coating liquid for a surface layer; and subjecting the coating film to at least one treatment selected from drying and curing (1)

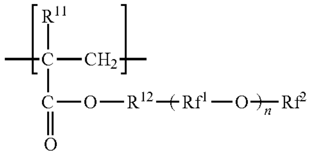

where $R^{11}$ represents a hydrogen atom or a methyl group, $R^{12}$ represents a single bond, a methylene group, or an ethylene group, "n" represents 3, $Rf^1$ represents a perfluoromethylene group, and $Rf^2$ represents a perfluoroalkyl group having 2 or 3 carbon atoms.

* * * * *